(12) United States Patent
Ikeda

(10) Patent No.: US 7,576,892 B2
(45) Date of Patent: Aug. 18, 2009

(54) COLOR IMAGE PROCESSING APPARATUS

(75) Inventor: Yoshinori Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/743,323

(22) Filed: May 2, 2007

(65) Prior Publication Data

US 2007/0279660 A1 Dec. 6, 2007

Related U.S. Application Data

(60) Division of application No. 08/995,884, filed on Dec. 22, 1997, now Pat. No. 7,221,475, which is a division of application No. 08/767,807, filed on Dec. 17, 1996, now Pat. No. 5,757,378, which is a division of application No. 08/557,482, filed on Nov. 14, 1995, now Pat. No. 5,619,634, which is a division of application No. 08/425,358, filed on Apr. 19, 1995, now Pat. No. 5,495,349, which is a continuation of application No. 07/853,739, filed as application No. PCT/JP91/01395 on Oct. 14, 1991, now abandoned.

(30) Foreign Application Priority Data

Oct. 13, 1990 (JP) .................................. 2-273912
Oct. 13, 1990 (JP) .................................. 2-273913

(51) Int. Cl.
*G06F 15/00* (2006.01)
*G06K 15/00* (2006.01)
*G03F 3/08* (2006.01)
*G06K 9/00* (2006.01)

(52) U.S. Cl. .................. 358/1.9; 358/2.1; 358/518; 382/167

(58) Field of Classification Search ................. 358/1.9, 358/537, 1.1, 538, 540, 518, 515, 523, 526, 358/530, 501, 2.1, 1.13; 382/162, 167
See application file for complete search history.

(56) References Cited

U.S. PATENT DOCUMENTS

| 4,591,904 A | 5/1986 | Urabe et al. | 358/537 |
|---|---|---|---|
| 4,622,582 A | 11/1986 | Yamada | 358/523 |
| 4,626,892 A | 12/1986 | Nortrup et al. | 348/569 |
| 4,679,074 A | 7/1987 | Sugiura et al. | 358/523 |
| 4,694,354 A | 9/1987 | Tanaka et al. | 358/296 |
| 4,727,434 A | 2/1988 | Kawamura | 358/280 |
| 4,760,386 A | 7/1988 | Heath et al. | 345/180 |
| 4,775,886 A * | 10/1988 | Hirosawa | 358/528 |
| 4,794,386 A | 12/1988 | Bedrij et al. | 715/803 |
| 4,827,410 A | 5/1989 | Corren | 715/840 |
| 4,862,390 A | 8/1989 | Weiner | 365/521 |
| 4,866,514 A | 9/1989 | Yeomans | 358/523 |

(Continued)

FOREIGN PATENT DOCUMENTS

| JP | 62-9428 | 1/1987 |
|---|---|---|
| JP | 1-237595 | 9/1989 |
| JP | 2-105677 | 4/1990 |

*Primary Examiner*—Madeleine A Nguyen
(74) *Attorney, Agent, or Firm*—Fitzpatrick, Cella, Harper & Scinto

(57) ABSTRACT

The invention relates to a color image processing apparatus and, more particularly, to adjusting means of a color tone and a sharpness. According to the invention, there is provided a color image processing apparatus characterized by having processing means for performing processes to given color image data; memory means which can store a plurality of processing parameters of the processing means together with peculiar names, and means for searching the registered processing parameters from the memory means.

6 Claims, 22 Drawing Sheets

U.S. PATENT DOCUMENTS

| | | | |
|---|---|---|---|
| 4,931,950 A | 6/1990 | Isle et al. ...................... 706/11 |
| 4,933,880 A | 6/1990 | Borgendale et al. ......... 715/515 |
| 4,945,476 A | 7/1990 | Bodick et al. ................ 600/301 |
| 4,956,703 A | 9/1990 | Uzuda et al. .................. 358/76 |
| 4,959,769 A | 9/1990 | Cooper et al. ............... 707/200 |
| 4,964,066 A | 10/1990 | Yamane et al. .............. 345/441 |
| 4,965,557 A | 10/1990 | Schepers et al. ............ 345/169 |
| 5,005,084 A | 4/1991 | Skinner ....................... 348/734 |
| 5,012,299 A * | 4/1991 | Sawamura et al. ............ 399/81 |
| 5,028,991 A * | 7/1991 | Sekizawa et al. ............ 358/537 |
| 5,041,866 A | 8/1991 | Imoto .......................... 355/38 |
| 5,060,059 A | 10/1991 | Mori et al. .................... 358/79 |
| 5,073,818 A | 12/1991 | Iida ............................. 358/523 |
| 5,079,624 A * | 1/1992 | Sasuga et al. ............... 358/530 |
| 5,113,248 A | 5/1992 | Hibi et al. ..................... 358/75 |
| 5,113,252 A | 5/1992 | Horie et al. .................. 358/528 |
| 5,121,497 A | 6/1992 | Kerr et al. .................... 395/650 |
| 5,134,667 A | 7/1992 | Suzuki ........................ 382/22 |
| 5,157,507 A | 10/1992 | Yamada ....................... 358/300 |
| 5,163,111 A | 11/1992 | Baji et al. ..................... 706/20 |
| 5,181,029 A | 1/1993 | Kim ............................ 241/20 |
| 5,182,796 A | 1/1993 | Shibayama et al. ......... 395/156 |
| 5,189,527 A | 2/1993 | Matsuda et al. ............. 358/440 |
| 5,194,892 A | 3/1993 | Robison ....................... 355/40 |
| 5,194,946 A | 3/1993 | Morikawa et al. ........... 358/505 |
| 5,208,683 A | 5/1993 | Okada ......................... 358/468 |
| 5,208,745 A | 5/1993 | Quentin et al. ................ 700/83 |
| 5,218,671 A * | 6/1993 | Liao et al. .................... 345/595 |
| 5,233,335 A | 8/1993 | Berwin ........................ 345/17 |
| 5,247,370 A * | 9/1993 | Takaoka ...................... 358/440 |
| 5,289,297 A * | 2/1994 | Bollman et al. ............. 358/537 |
| 5,311,334 A * | 5/1994 | Sugiura ....................... 358/537 |
| 5,361,329 A * | 11/1994 | Morita et al. ................. 358/1.2 |
| 5,495,349 A | 2/1996 | Ikeda .......................... 358/518 |
| 5,504,499 A | 4/1996 | Horie et al. .................. 345/150 |
| 5,533,186 A | 7/1996 | Tanahashi et al. ........... 345/549 |
| 5,576,847 A | 11/1996 | Sekine et al. ................ 358/448 |
| 5,583,985 A | 12/1996 | Kohiyama et al. .......... 345/534 |
| 5,624,194 A | 4/1997 | Matsuzawa ................. 400/477 |
| 5,630,038 A | 5/1997 | Itoh et al. .................... 395/131 |
| 5,841,076 A | 11/1998 | Schwartz et al. ......... 177/25.13 |

\* cited by examiner

| CONTENTS | ADDRESS | DATA |
|---|---|---|
| UCR CHARACTERISTICS M | A | 04 |
| UCR CHARACTERISTICS C | B | 04 |
| UCR CHARACTERISTICS Y | C | 04 |
| INKING AMOUNT CHARACTERISTICS | D | 04 |
| COLOR CHARACTERISTICS M | E | 05 |
| COLOR CHARACTERISTICS C | F | 05 |
| COLOR CHARACTERISTICS Y | G | 05 |
| COLOR CHARACTERISTICS K | H | 05 |
| EDGE PARAMETER K | I | 05 |
| EDGE PARAMETER L | J | 14 |

FIG. 15C

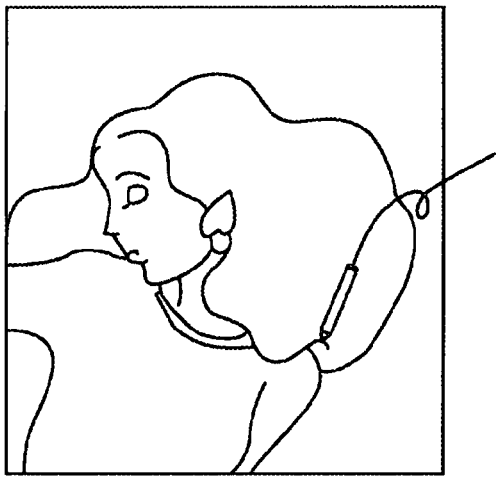
FIG. 16B       FIG. 16C
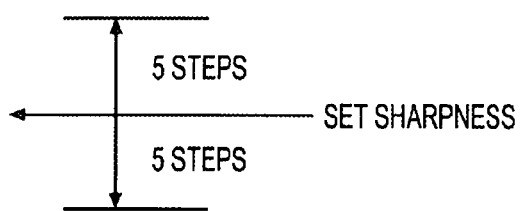
FIG. 17

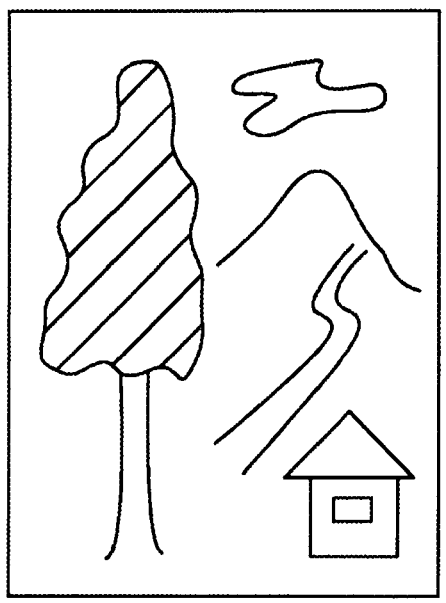 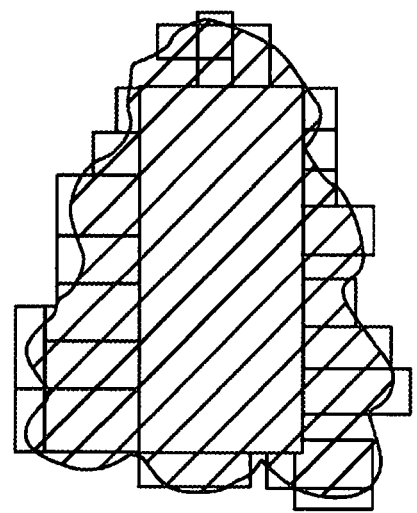
FIG. 21　　FIG. 22
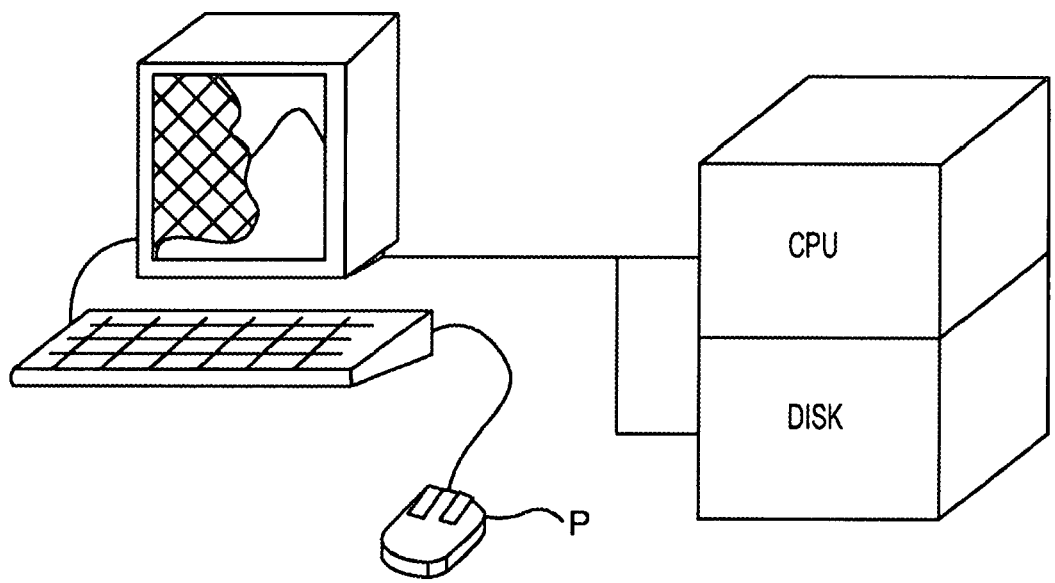
FIG. 23

COLOR IMAGE PROCESSING APPARATUS

This application is a division of U.S. patent application Ser. No. 08/995,884, filed Dec. 22, 1997, which is a division of U.S. patent application Ser. No. 08/767,807, filed Dec. 17, 1996, now U.S. Pat. No. 5,757,378, which is a division of U.S. patent application Ser. No. 08/557,482, filed Nov. 14, 1995, now U.S. Pat. No. 5,619,634, which is a division of U.S. patent application Ser. No. 08/425,358, filed Apr. 19, 1995, now U.S. Pat. No. 5,495,349, which is a continuation of U.S. patent application Ser. No. 07/853,739, filed Jun. 5, 1992, now abandoned, which was the National Stage of International Application No. PCT/JP91/01395, filed Oct. 14, 1991.

TECHNICAL FIELD

The invention relates to a color image processing apparatus and, more particularly, to adjusting means of a color tone and a sharpness.

BACKGROUND ART

In recent years, full color copying apparatuses are widely spread and the color tone and sharpness can be also relatively easily adjusted. For instance, as shown in FIG. 18, a level display displayed on a panel is operated by a touch key, thereby adjusting a color balance. A picture quality is adjusted by a function to adjust a ratio of each chrominance component by % (percent) as shown in FIG. 19(*b*) after a desired color was selected as shown in FIG. 19(*a*), a function to adjust a magnitude of a sharpness emphasis by a scale as shown in FIG. 20, or the like.

Subjects that the Invention is to Solve

In the above apparatus, for instance, in the case where an image having a desired picture quality is obtained by adjusting the sharpness after the color balance was adjusted, several trial copies are ordinarily performed, so that vain copies and a surplus time occur. In the case where, after the operator was away from the machine after that, he wants to again obtain a similar picture quality after a little while, there is a possibility such that another person has changed the setting during such a period of time or the setting mode has automatically been returned to the initial setting mode. Therefore, the same adjusting procedure must be again executed and the costs and time are expanded in vain. To prevent such a drawback, it is sufficient to record the contents which have been set after completion of each adjustment by writing them onto a memorandum or the like. However, when the operations become complicated, an amount of contents also increases and it is very troublesome to individually perform the operations. In recent years, there is also an apparatus having a "memory key" function to store the setting content at a certain time point into an internal memory. However, there is a drawback such that the number of keys is limited and the number of setting modes which can be registered is limited and, when the number of keys is increased, the number of keys on an operating section vainly increases and the operations rather become complicated.

In consideration of the above drawbacks, it is an object of the invention to provide a color image processing apparatus which can easily set complicated processing methods for a color image.

DISCLOSURE OF THE INVENTION

To accomplish the above subjects, the present invention has: processing means for executing a plurality of content processes for given color image data; setting means for setting processing parameters of a plurality of processes to the processing means; and means for adding inherent names to the processing parameters which have been set by the setting means and for registering.

To accomplish the above subjects, the invention has: processing means for performing processes to given color image data; memory means which can store a plurality of processing parameters of the processing means together with inherent names; and means for searching the registered processing parameters from the memory means.

BRIEF DESCRIPTION OF DRAWINGS

FIGS. 15A-15C are diagrams showing an operating procedure for an effect registration;

FIGS. 16A-16C are diagrams showing an operating procedure for an effect designation;

FIG. 17 is a diagram showing parameters to set a sharpness;

FIGS. 21, 22 and 23 are diagrams for explaining another method of designating an area.

EMBODIMENTS

Figure 1:
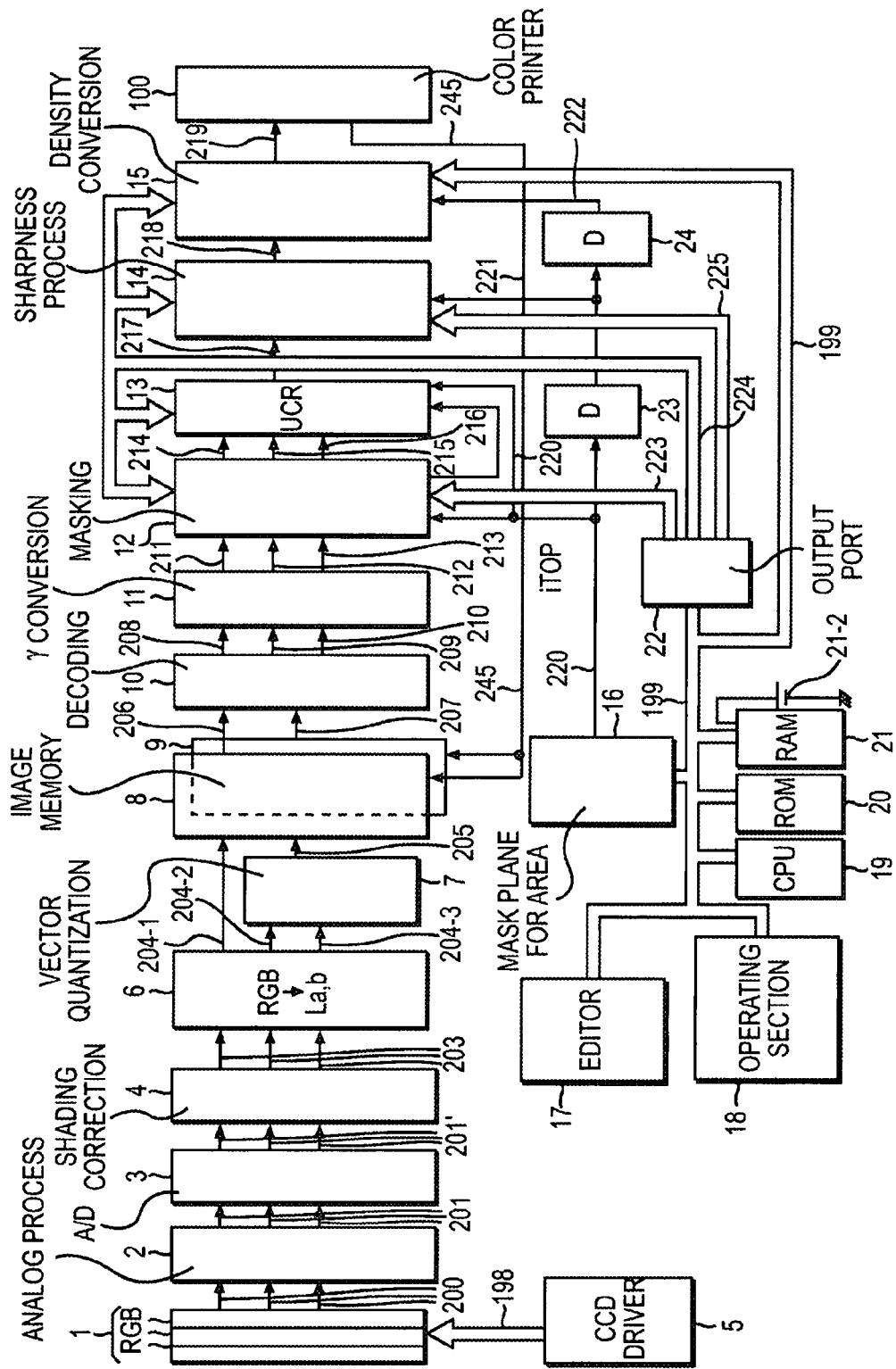
FIG. 1 is a block diagram showing a whole construction of an embodiment of the present invention.

An embodiment of the present invention will be described hereinbelow with reference to the drawings. FIG. 1 shows a whole constructional diagram of an image processing apparatus according to the invention. The whole schematic operation will now be described. Reference numeral 1 denotes a color image sensor for color separating a reflection light image from a color image original every line and every pixel and for converting into a corresponding electric signal. For instance, the color image sensor 1 is constructed by pixels of about 4700 pixels×R, G and B (three lines) so as to read the image of the whole width of the A3 size by a pixel density of 400 d.p.i. Read color image signals 200 are processed by an analog processing circuit 2 so as to match with input dynamic ranges of a black/white balance A/D converter 3 with respect to each color and are converted into the digital signals by the A/D converter 3 at the next stage, so that digital image signals 201 of respective colors are obtained. A shading correcting circuit 4 corrects a light amount variation of a reading optical system (not shown), a sensitivity variation of every pixel of a CCD sensor, and the like. The apparatus has a construction such that the read full color image is once stored into an image memory and is thereafter read out synchronously with a sync signal from, for example, a color printer. Therefore, the data is compressed, thereby reducing a memory capacity. Since the human eyes have characteristics such that a sensitivity is high for the luminance component in the image and a sensitivity is relatively low for the chrominance component, the read R, G and B signals are converted into an L signal as a luminance component and a and b components as chrominance components (6). The luminance component is directly supplied to an image memory 8 and the a and b components are vector quantized (7) and the data amounts are reduced and, after that, they are stored into an image memory 9. Since a method of converting the R, G and B signals into the L, a and b components and a method for vector quantization are not the essential points of the present invention, their detailed description is omitted here. The coded image signals which have once been stored in the image memories 8 and 9 are read out in correspondence to the image outputs of the respective colors synchronously with a sync signal ITOP 245 in the sub scanning direction which is obtained from a color printer 100 (206, 207). The image signals are again decoded into R, G and B (208, 209, 210) signals by a decoding circuit 10. A γ converting circuit 11 converts the R, G and B signals into C, M and Y signals corresponding to densities of coloring agents.

To chrominance signals 211, 212 and 213 (corresponding to M: magenta, C: cyan, Y: yellow) corresponding to the image signals, what are called masking process, inking, and undercolor removal (UCR) to correct impurities of the colors due to the unnecessary absorption in the spectral characteristics of the coloring agents which are used in the printer, practically speaking, the magenta toner, cyan toner, and yellow toner in this case are executed, thereby obtaining an image reproduction near the color tone which the original has. In a sharpness process 14 at the next stage, components having a high spatial frequency in the image are emphasized and a sharpness is enhanced. In a density converting circuit 15, the highlight portion and shadow portion of each chrominance signal can be emphasized and the adjustment of the whole tone and the like can be executed. As will be explained hereinbelow, a plurality of parameters regarding the masking processing arithmetic operations, a plurality of parameters to determine a magnitude of the sharpness in the sharpness process, and a plurality of density converting characteristics can be independently variably set by a CPU 19. Further, as will be explained hereinlater, those parameters and characteristics can be switched to a plurality of values by area setting signals 220, 221 and 222 at a high speed.

A pattern corresponding to the area of an arbitrary shape which is supplied from an editor 17 is written in a mask plane 16 for area by the CPU 19. The pattern is read out synchronously with the image upon formation of the image and the foregoing area setting signals 220, 221 and 222 are produced on the basis of the read pattern. On the other hand, the processing contents in the designated area, for instance, the parameters regarding the color tone and sharpness are determined as will be explained hereinlater on the basis of an instruction which is given by the operator via an operating section 18. Reference numerals 20, 21 and 22 denote a program ROM, a data RAM, and an output port for the CPU.

Figure 2:
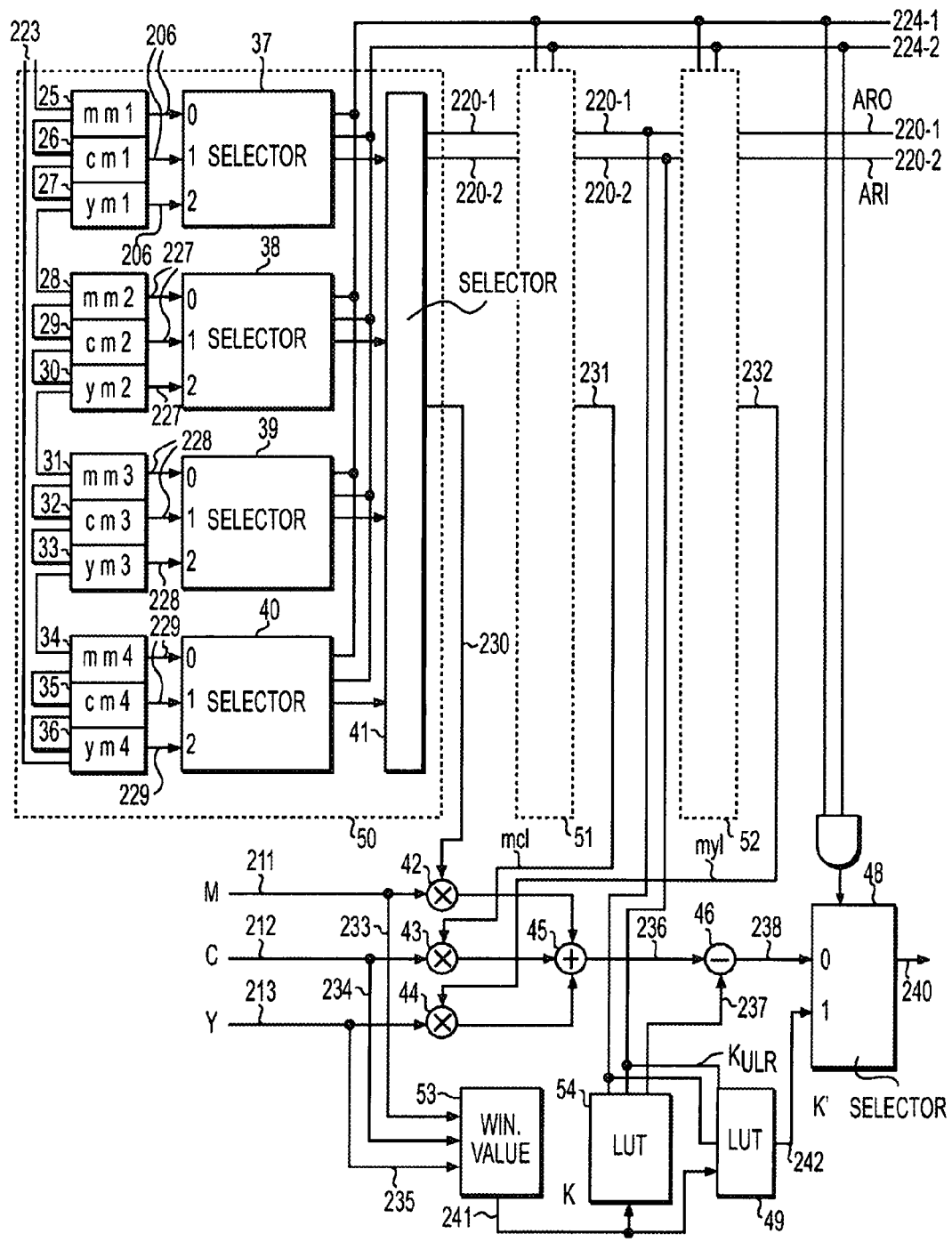
FIG. 2 is a diagram showing a construction of a masking processing section.

FIG. 2 is a diagram showing a construction of a masking processing arithmetic operating circuit. It is well known that the masking process is realized by a printing technique or the like by the following arithmetic operations $$\begin{bmatrix} M' \\ C' \\ Y' \end{bmatrix} = \begin{bmatrix} mm & mc & my \\ cm & cc & cy \\ ym & yc & yy \end{bmatrix} \begin{bmatrix} M \\ C \\ Y \end{bmatrix}$$

for the input chrominance signals (M, C, Y). Ordinarily, since the above arithmetic operating parameters are unconditionally determined by the toners with respect to one kind of image, it is sufficient to also prepare nine kinds of parameters of mm to yy as mentioned above. In the embodiment, four kinds of sets of parameters are prepared. For instance, [$mm_1$-$yy_1$] to [$mm_4$-$yy_4$] are prepared and switched on a pixel unit basis by signals 220-1 and 220-2, thereby enabling the masking arithmetic operations to be executed by the different parameters even in the same image. Reference numerals 224-1 and 224-2 denote color switching signals which are generated from the output port 22 on the basis of the control of the CPU 19 in a manner such that they are set to "0, 0" during the output of M, to "0, 1" during the output of C, and to "1, 0" during the output of Y. When the signals 224-1 and 224-2 are set to "0, 0", in a block 50, the input "0" is selected in all of selectors 37, 38, 39 and 40 so as to be supplied as coefficients for the main color component of M among three groups and four sets which have been set in registers 25 to 36. $mm_1$, $mm_2$, $mm_3$ and $mm_4$ are supplied to a selector 41. That is, desired values of $mm_1$ to $mm_4$ are selected as coefficients of the main color component by the area signals 220-1 and 220-2. Similarly, $cm_1$ to $cm_4$ denote coefficients for a correction signal M upon formation of the C image and $ym_1$ to $ym_4$ similarly denote coefficients for the correction signal M upon formation of the Y image.

Blocks 51 and 52 have constructions similar to that of the block 50. The operations are substantially the same as those of the block 50 except that only the correspondence of the color differs. The whole operations will now be explained with respect to the case of forming the M image as an example. Now, assuming that the area signals 220-1 and 220-2 are, for instance, set to "0, 0", for the image signals M, C and Y (211, 212, 213), $mm_1$ is supplied to a multiplier 42, $mc_1$ and $my_1$ are supplied to multipliers 43 and 44, and M×$mm_1$, C×$mc_1$, and Y×$my_1$ are generated as outputs. On the other hand, min(M, C, Y), namely, the black component is calculated (241) in a minimum value circuit 53 and passes through an LUT 54 and a density converted value $K_{UCR}$ 237 is generated as an UCR amount and is subtracted from an output 236 (M×$mm_1$+C×$mc_1$+Y×$my_1$) of an adder 45 by 46. Therefore, $K'_1$ (242) is generated as an output 240 upon formation of the black image and an output 238, namely, (M×$mm_1$+C×$mc_1$+Y×$my_1$)−$K_{UCR}$ is generated upon formation of the images of M, C and Y. The masking and UCR processes are completed. Moreover, as mentioned above, the coefficients $mm_1$, $mc_1$ and $my_1$ can be arbitrarily varied here by area signals 220-1, 220-2, $AR_0$, and $AR_1$.

Delay circuits 23 and 24 have different delay amounts and correct the image delays which are caused for periods of time, for instance, from time points when the image signals 211, 212 and 213 are subjected to the masking and UCR processes to time points when the processed signals are supplied to the sharpness circuit at the next stage. For instance, now assuming that a delay of M pixels occurs in the masking and UCR circuit and a delay of N pixels occurs in the sharpness processing circuit, the delay circuits 23 and 24 are provided as delay circuits having delay amounts of M and N pixels, respectively.

Figure 3A:
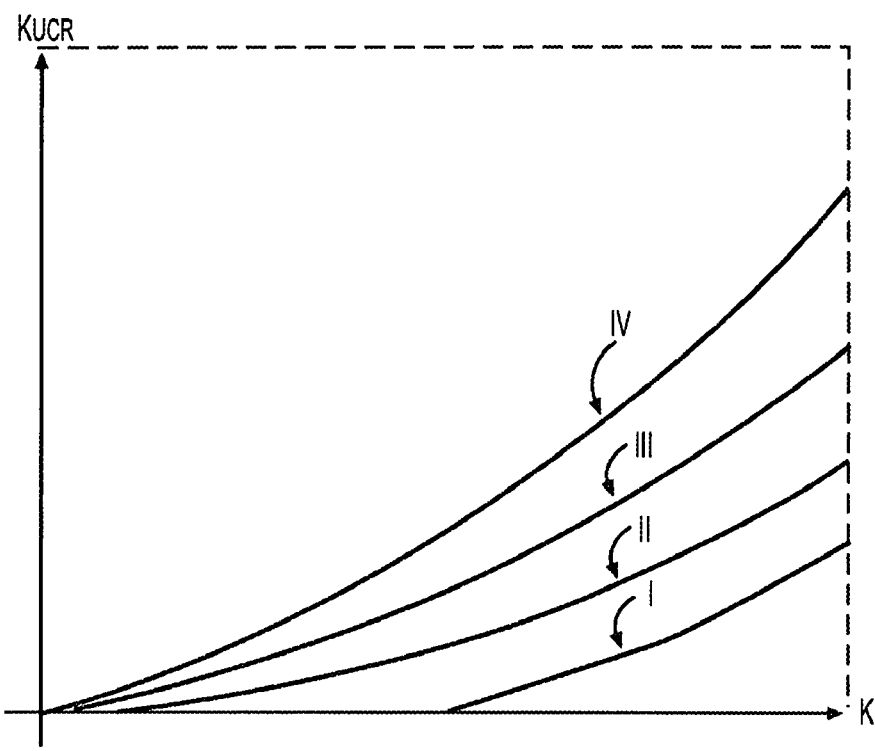
FIGS. 3A and 3B are diagrams showing UCR and inking characteristics.
Figure 3B:
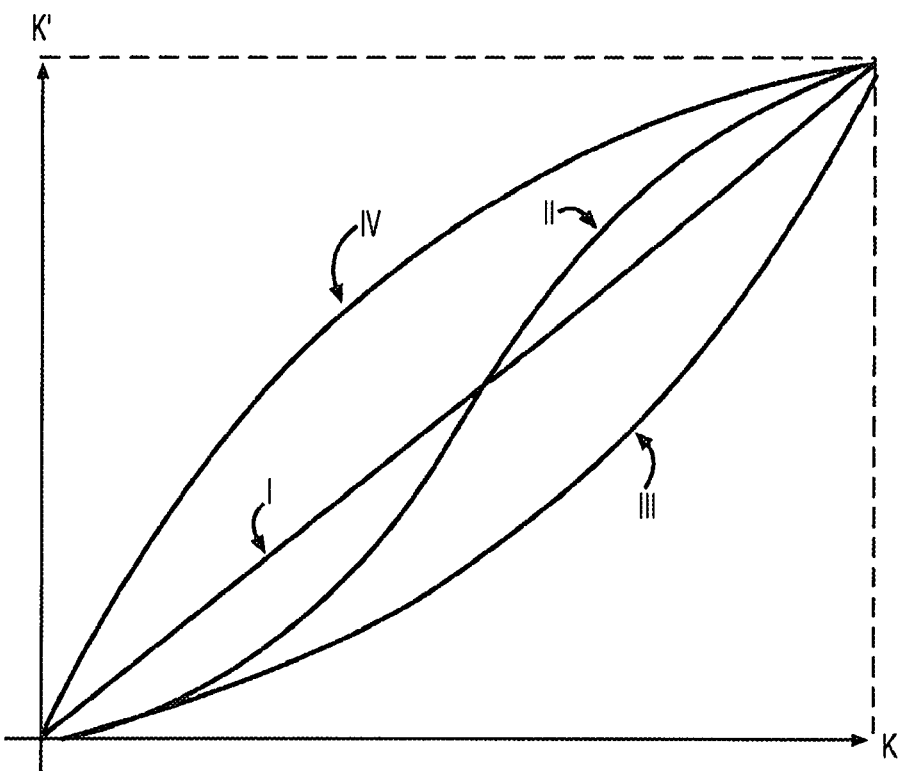

Further, a plurality of sets of lookup tables LUTs 54 and 49 to determine an UCR amount and an inking amount are also prepared. In a manner similar to the above, for instance, characteristics as shown in FIGS. 3(a) and 3(b) can be switched by the area signals $AR_0$ and $AR_1$ and the characteristics I→II→III→IV can be also selected.

Figures 4A, 4B:
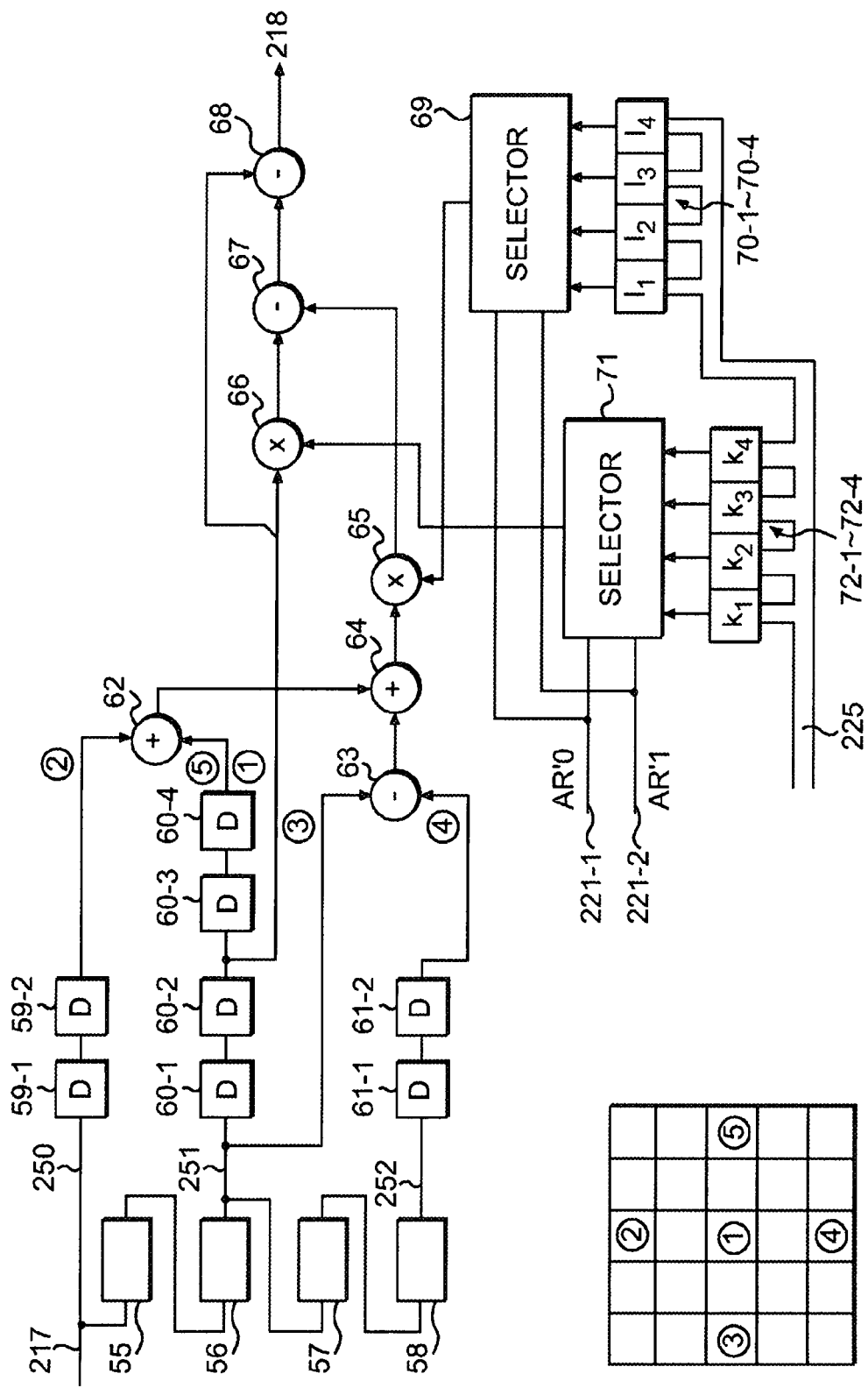
FIGS. 4A and 4B are diagrams showing a construction of a sharpness processing section.

The sharpness processing circuit 14 will now be described. In the embodiment, the sharpness processing circuit is based on a well-known method by so called a Laplacian method. That is, as shown in FIG. 4(a), for example, in a block of small pixels of 5×5, when it is assumed that a density value of the center pixel is set to ① and density values of the pixels around the center pixel are set to ②, ③, ④ and ⑤, an edge amount E is calculated by what is called E=k×①-l×(②+③+④-⑤). The edge emphasized signal is derived by D=E+①. In order to calculate the black of 5×5, a line 251 including the center pixel, a line 252 which is preceding to the line 251 by two lines, and a line 250 which follows the line 251 by two lines are obtained at the same timing by line memories 55, 56, 57 and 58 each having an FiFo structure. Further, the center pixel ① and the peripheral pixels ②, ③, ④ and ⑤ are obtained by delay elements D (59-1, 59-2, 60-1 to 60-4, 61-1, 61-2), thereby calculating the edge amount. In the above circuit as well, the values of k and l of coefficient registers 70-1 to 70-4 and 72-1 to 72-4 can be varied to four kinds of values within ranges of $k_1$ to $k_4$ and $l_1$ to $l_4$ by area setting signals $AR'_0$ (221-1) and $AR'_1$ (221-2) indicative of arbitrary shapes in the image. For example, when it is assumed that $(AR_0, AR_1)=(1, 0)$, $l_2$ and $k_2$ are selected by selectors 69 and 71, respectively, and are supplied to multipliers 65 and 66, so that the edge amount is set to $$E=①\times k_2-l_2\times(②+③+④+⑤)$$

A sharpness emphasis different from that mentioned above is obtained. Further, the coefficients k and l can be arbitrarily rewritten by the control of the CPU as will be explained hereinlater and the edge amount can be also finely adjusted by an adjusting mechanism.

Figure 5A:
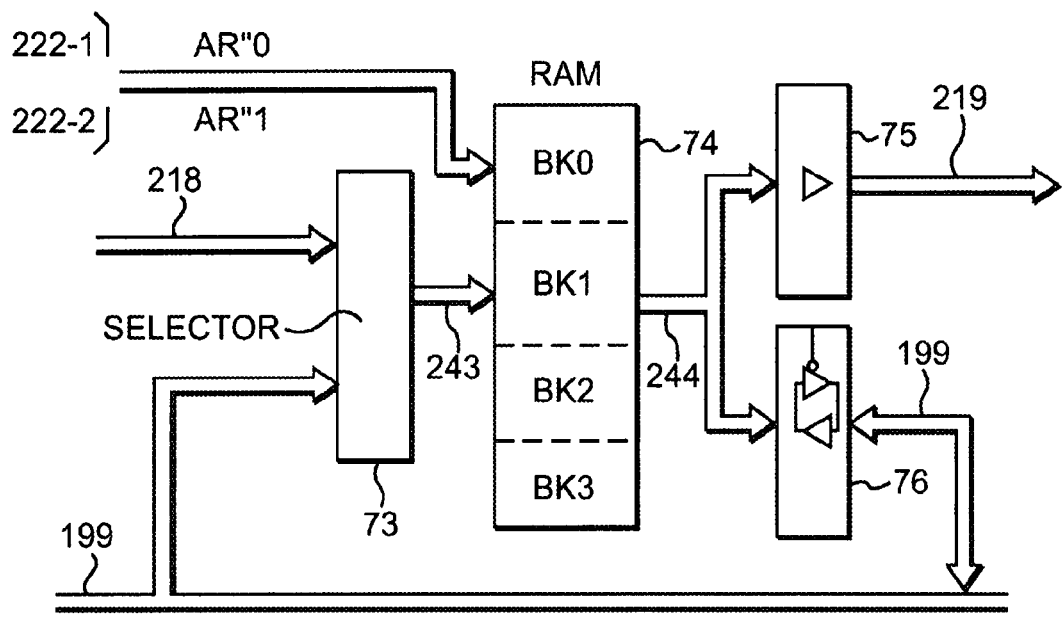
FIGS. 5A and 5B are diagrams showing a construction of a density converting section.
Figure 5B:
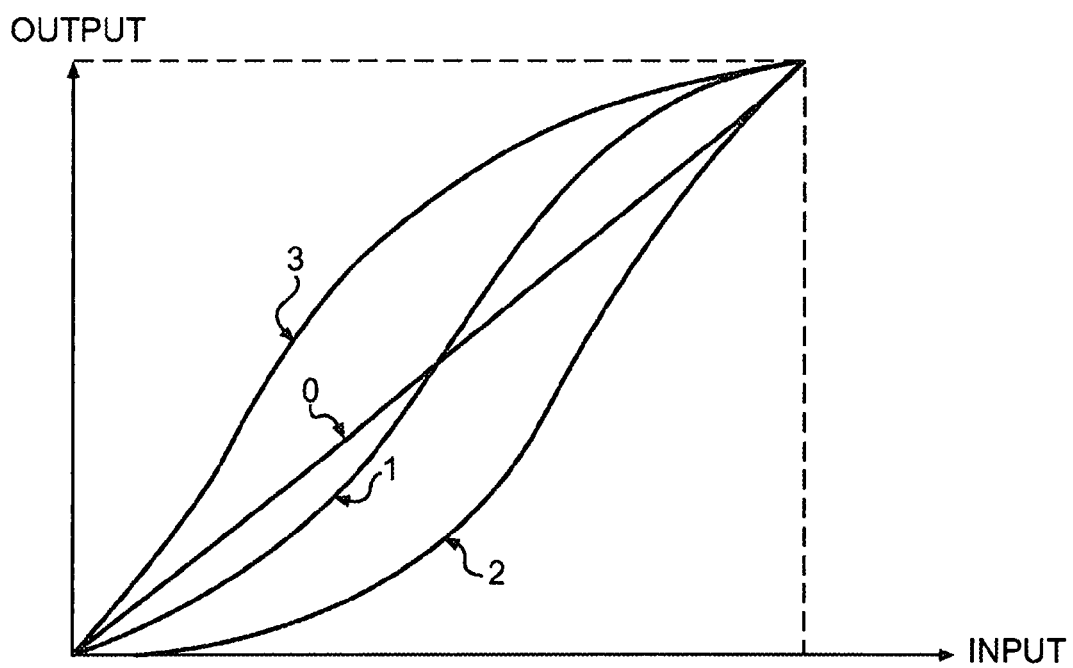
Figure 6:
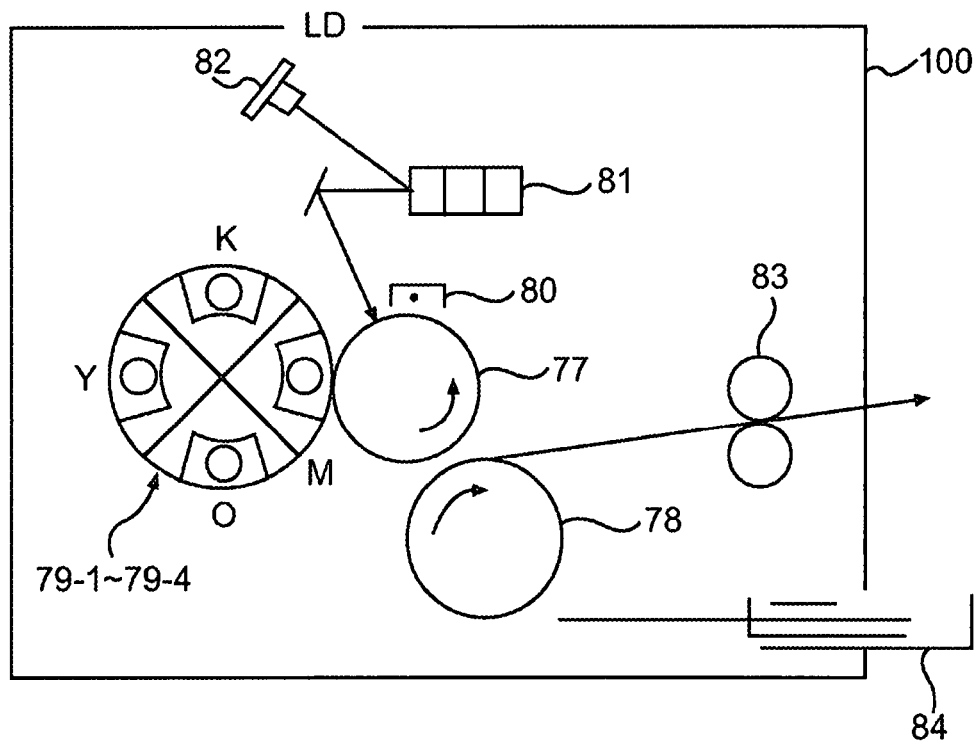
FIG. 6 is a cross sectional view of a color laser beam printer.

FIG. 5 is a diagram showing a construction of the density converting block 15. As a fundamental operation, the density converting block 15 has functions such that the image data is supplied from 218 and is density converted by an LUT (lookup table) 74 and, for instance, the highlight portion is emphasized by the shadow portion or the color balance is adjusted. Reference numeral 199 denotes a CPU bus. A different LUT can be set every color by rewriting the contents in the LUT 74 comprising an RAM by the CPU in the non-image output operation. In the above LUT as well, the density converting characteristics can be switched by area setting signals $AR''_0$ and $AR''_1$ (222-1, 222-2) in accordance with an arbitrary shape of the image as will be explained hereinlater. Now, assuming that the number of bits of the image data is set to eight bits, for instance, 256×4=1024 bytes for four banks of $Bk_0$ to $Bk_3$. The rewriting operation of the LUT is completed in about 10 msec even when, for example, it takes 10 μsec to write data of one byte. The color printer according to the embodiment is a full color printer of the type as shown in FIG. 6. Namely, a laser beam which has been image modulated by a laser diode 82 is reflected by a polygon mirror 81. While the laser beam is being raster scanned, a latent image corresponding to each of the color separation images is area sequentially formed onto a photo sensitive drum. The latent images are area sequentially developed by corresponding developing devices (M, C, Y, K) 79-1 to 79-4. The developed images are area sequentially copy transferred onto a copy paper wrapped on a copy transfer drum 78. The images of four colors of M, C, Y and K are overlaid. After that, the paper is peeled off from the copy transfer drum and the images are fixed by a thermal pressure fixing device 83, thereby finishing the full color copy of one sheet. A time interval between surfaces is equal to about one to two seconds. Therefore, since there is an enough time to rewrite the LUT 74, no problem occurs. FIG. 5(b) shows an example of writing characteristics of the LUT 74. 0: the input/output characteristics are linear. 1: both of the high-light portion and the shadow portion are slightly emphasized and are set to slightly hard tones. 2: the highlight portion is emphasized. 3: the shadow portion is emphasized. Either one of 0 to 3 is properly selected by the area setting signals $AR''_0$ and $AR''_1$.

Figure 7:
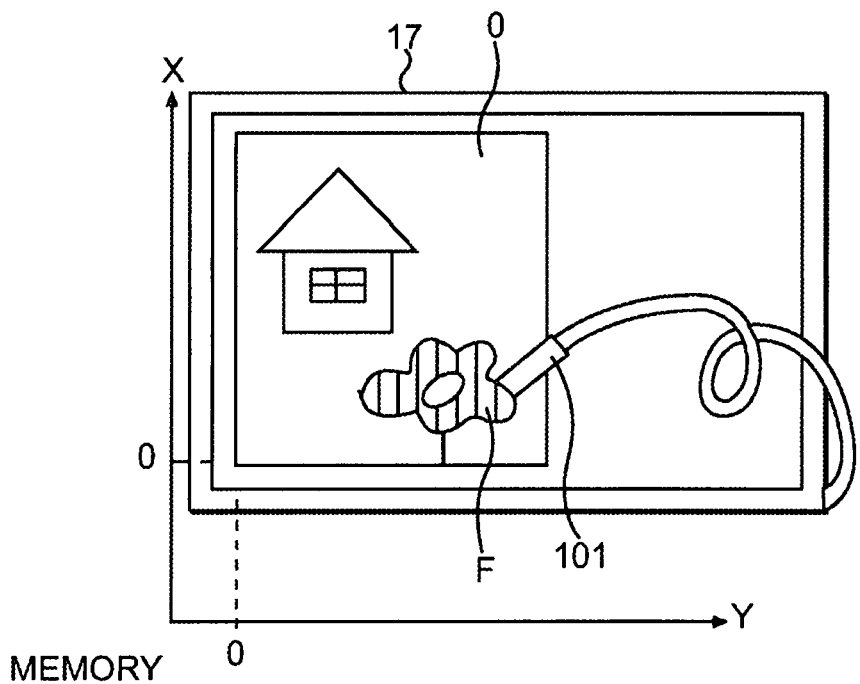
FIGS. 7, 8A, 8B and 9 are diagrams for explaining a method of designating an area.

Means for setting an area of an arbitrary shape on the basis of the coordinates of points which are continuously given by an editor will now be described. FIG. 7 shows a state in which an original O is put onto the editor 17 and a non-rectangular area F in the original is designated by using an editor pen 101. For instance, the left corner of the editor panel surface is set to a start point, the sub scanning direction is set to the Y direction, and the main scanning direction is set to the X direction. Coordinates (X, Y) of the indicated point are supplied from the editor 17 to the CPU 19 as data indicative of the Xth pixel after Y lines from the start point. On the other hand, since the mask plane memory for area described in FIG. 1 is a mask plane which is provided for an area so as to correspond to the image areas in a one-to-one corresponding manner, it is sufficient for the CPU to successively write the values necessary for addresses $(X_n, Y_n)$ corresponding to supplied coordinate points $(X_n, Y_n)$.

Figure 8A:
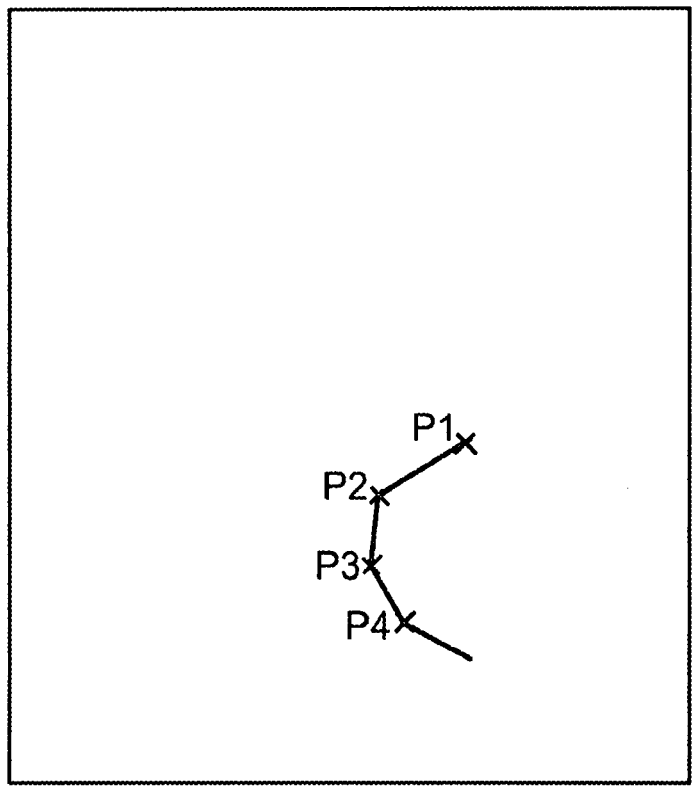
Figure 8B:
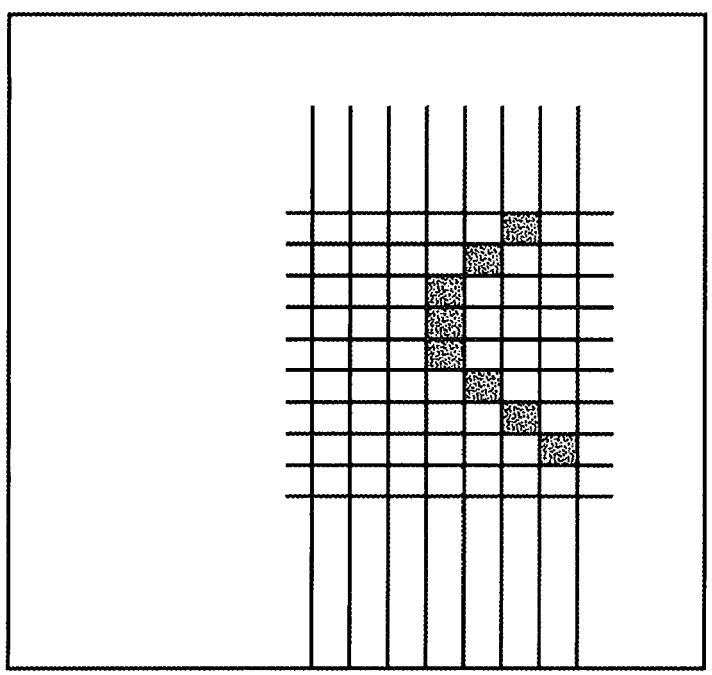
Figure 9:
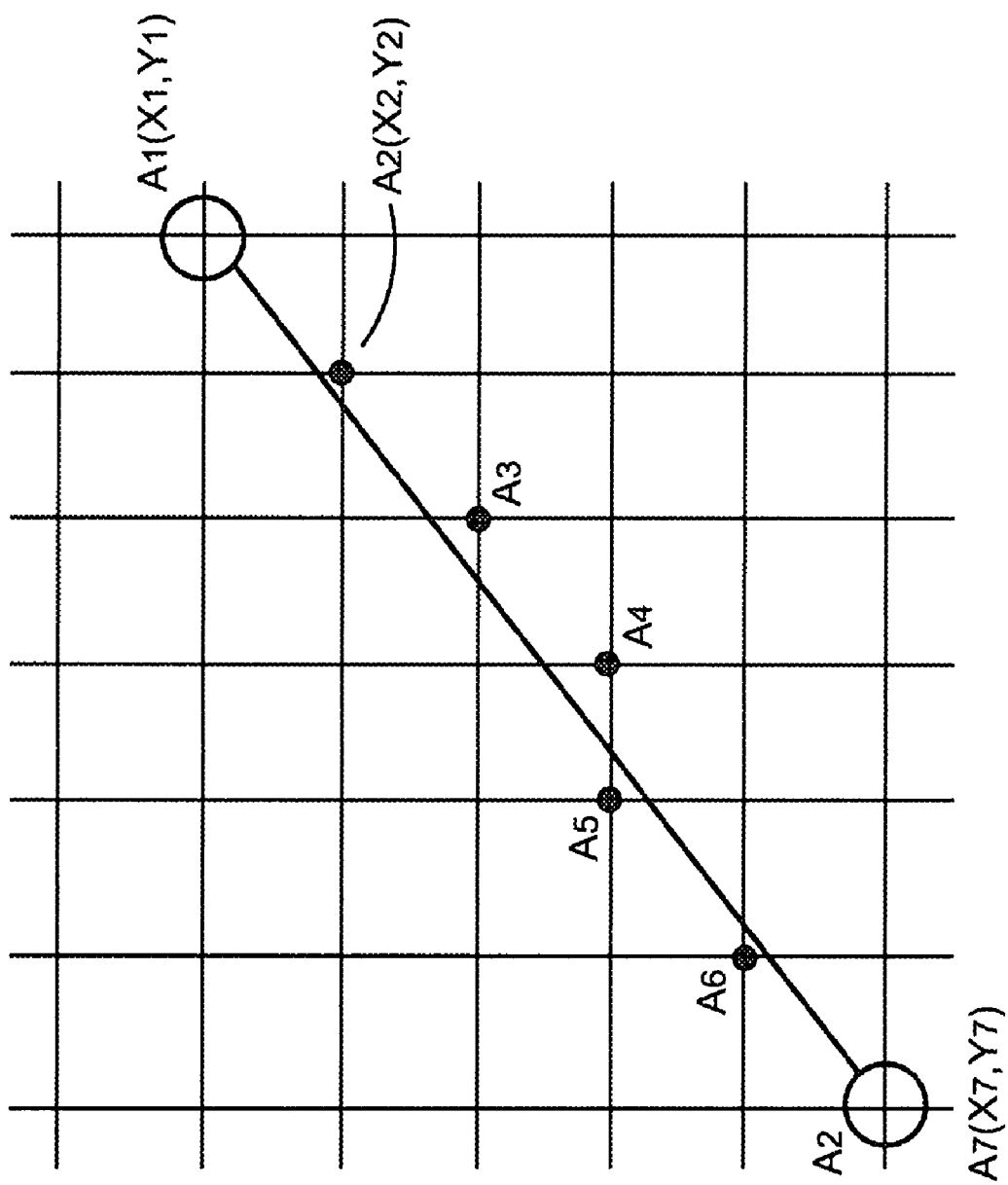

For instance, when it is now assumed that the editor pen continuously passes along a path of $P_1 \rightarrow P_2 \rightarrow P_3 \rightarrow P_4$ as shown in FIG. 8(a) and the points sampled at regular time intervals are set to $P_1, P_2, P_3$ and $P_4$, it is sufficient to write predetermined data into corresponding addresses (black points) in the memory as shown in FIG. 8(b). In this instance, the connection (for example, $P_1$ and $P_2$, $P_2$ and $P_3$) -between the sampling points is executed by a linear interpolation on the basis of the coordinates of two points. Therefore, a non-rectangular arbitrary shape is formed by connecting short line segments. An interpolating method will now be described in accordance with FIG. 9. Assuming that the sampling points are set to $A_1(X_2, Y_2)$ and $A_7(X_7, Y_7)$, a straight line passing two points $A_1$ and $A_7$ is $$Y_n - Y_1 = \frac{Y_7 - Y_1}{X_7 - X_1}(X_n - X_1)$$

Thus, $$X_n = \frac{(Y_n - Y_1)(X_7 - X_1)}{Y_7 - Y_1} + X_1 \qquad (1)$$

Since it is sufficient to increase one line by one in the Y direction, $Y_2=Y_1-1, Y_3=Y_1+2, \ldots$ and the line number is increased one by one until $Y_7$. Therefore, by substituting it into the equation (1), for example, $$X_2 = \frac{X_7 - X_1}{Y_7 - Y_1} + X_1, X_3 = \frac{2(X_7 - X_1)}{Y_7 - Y_1} + X_1, \ldots$$

Since $X_n$ is an integer, by selecting to the nearest integer, the coordinates of $(X_n, Y_n)$ are decided. It is sufficient to sequentially write the data into the addresses. In the embodiment, since the data to be written is constructed, for example, so as to designate four kinds of areas by a depth of two bits, "00", "01", "10" and "11" are written in accordance with the areas. For instance, in the case of designating the first area, by writing the data of "01" into the address indicated by the black dot in FIG. 8(b), accordingly, the address which is calculated by the equation (1), the area setting operation is finished.

Figure 10A:
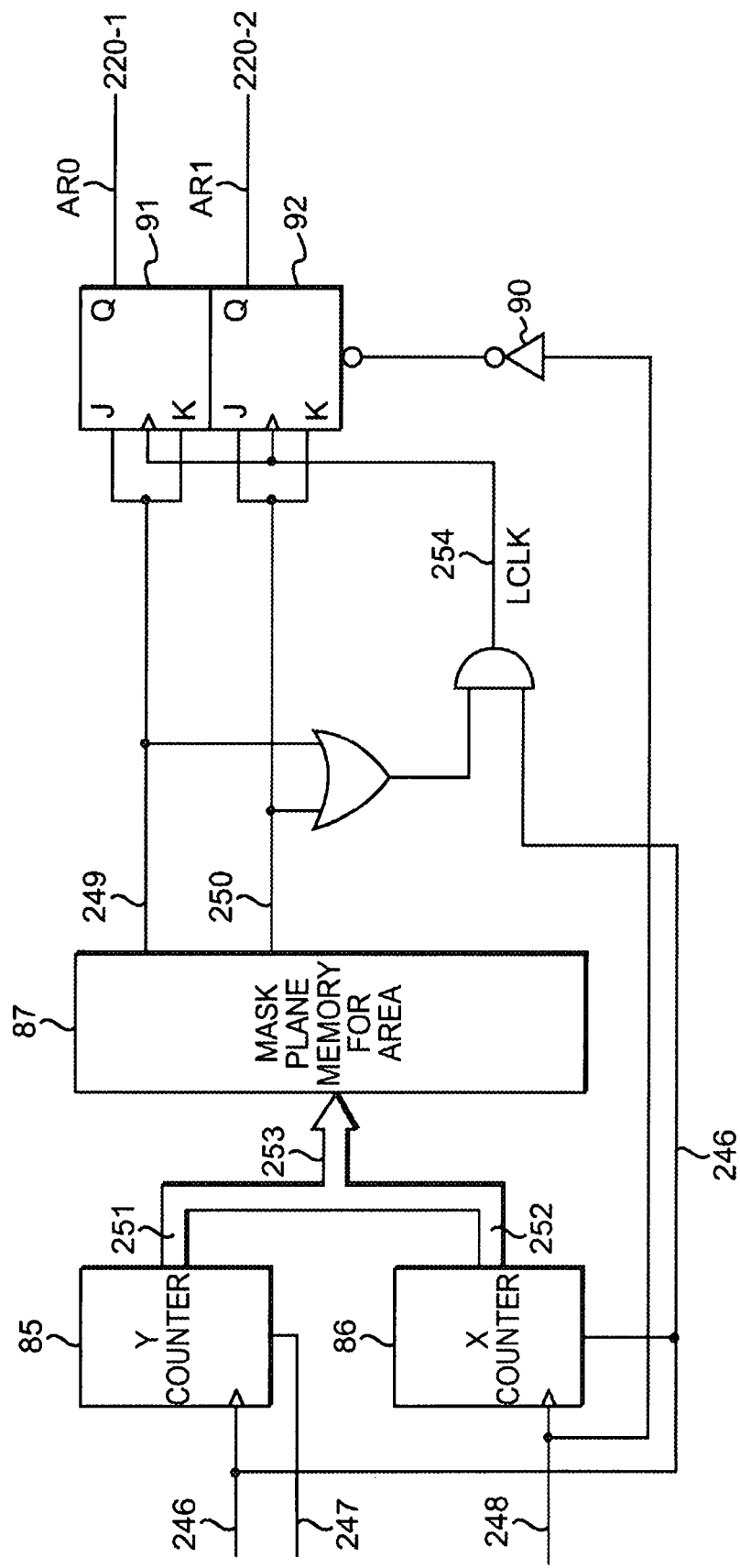
FIGS. 10A-10C are diagrams for explaining the production of an area signal.

Explanation will now be made with respect to a method of producing actual area signals from the area designation data which has been preset in the mask plane memory for area in FIGS. 10(a), 10(b) and 10(c). Reference numeral 87 denotes a mask plane memory for area. For instance, assuming that the apparatus has a memory corresponding to only a capacity of the whole surface of the A3 size in which an image input density is set to 400 d.p.i., $$297 \times 420 \times \{(25.4/400)^{-1}\}^2 = 31 \text{ M pixels}$$

Therefore, the memory has a capacity of 2 bits×31 M. X and Y counters count pixel clocks (248) and horizontal sync signals (246), thereby producing X and Y addresses in the memory, respectively. On the basis of a sync signal (not shown) 247 in the sub scanning direction, the count value of the Y counter is initialized to "0" and the count value of the X counter is initialized to "0" by the horizontal sync signal 246. Only in the cases other than the case where data 249 and 250 of two bits for area production which have been read out by an address 253 produced by the X and Y counters are equal to "0, 0", an LCLK 254 which is supplied to J/K flip-flops 91 and 92 is stopped. When the data 249 and 250 are equal to "0, 1", "1, 0", or "1, 1", the LCLK is supplied.

Figure 10B:
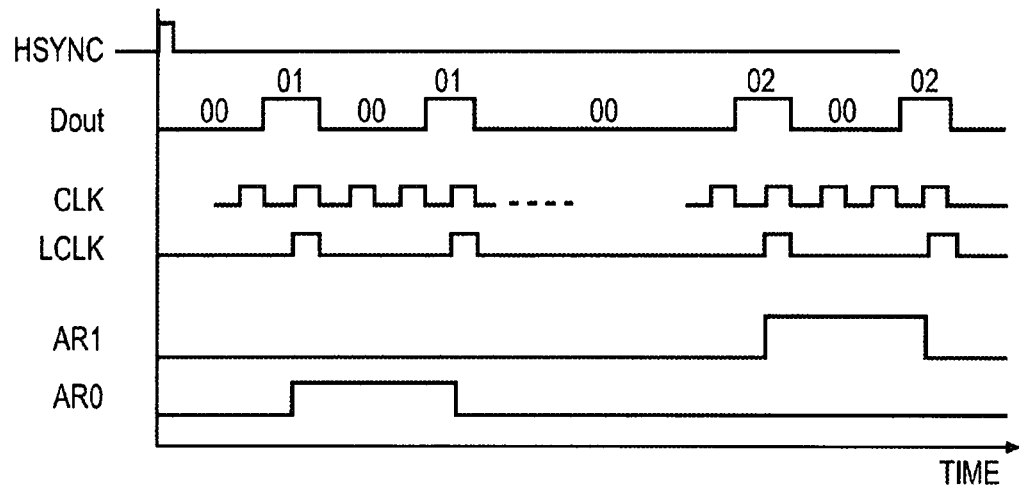
Figure 10C:
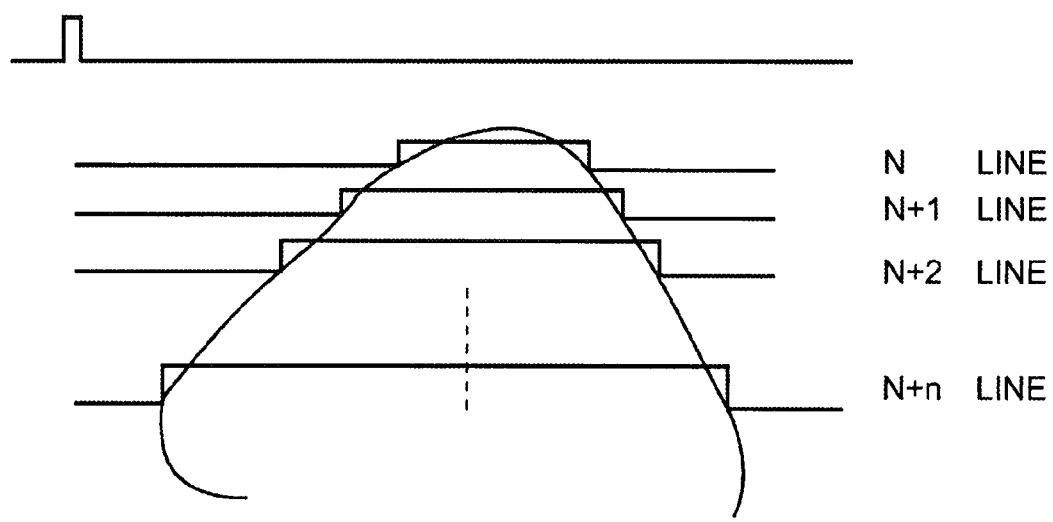

That is, when the data in the memory are equal to values other than "0, 0", the outputs are inverted by the J/K FF 91 and 92, so that the area signals $AR_0$ and $AR_1$ are produced as shown in FIG. 10(b). For instance, for a curve area as shown in FIG. 10(c), the area signals of the Nth line, (N+1)th line, . . . , and (N+n)th line are produced and supplied as area signals which function in FIGS. 2, 4(b) and 5(a).

Although a digitizer has been used in the above embodiment, for instance, the invention is not limited to the digitizer for an image of computer graphics or the like, but it is also possible to use an image designating method by a computer by using a pointing device (also called a mouse) as shown in FIG. 23.

Consequently, in the case of area designating a portion of a "tree" in a non-rectangular image, for example, an image as shown in FIG. 21, it is possible to designate more accurately than the conventional designation by a rectangle as shown in FIG. 22.

Figure 11:
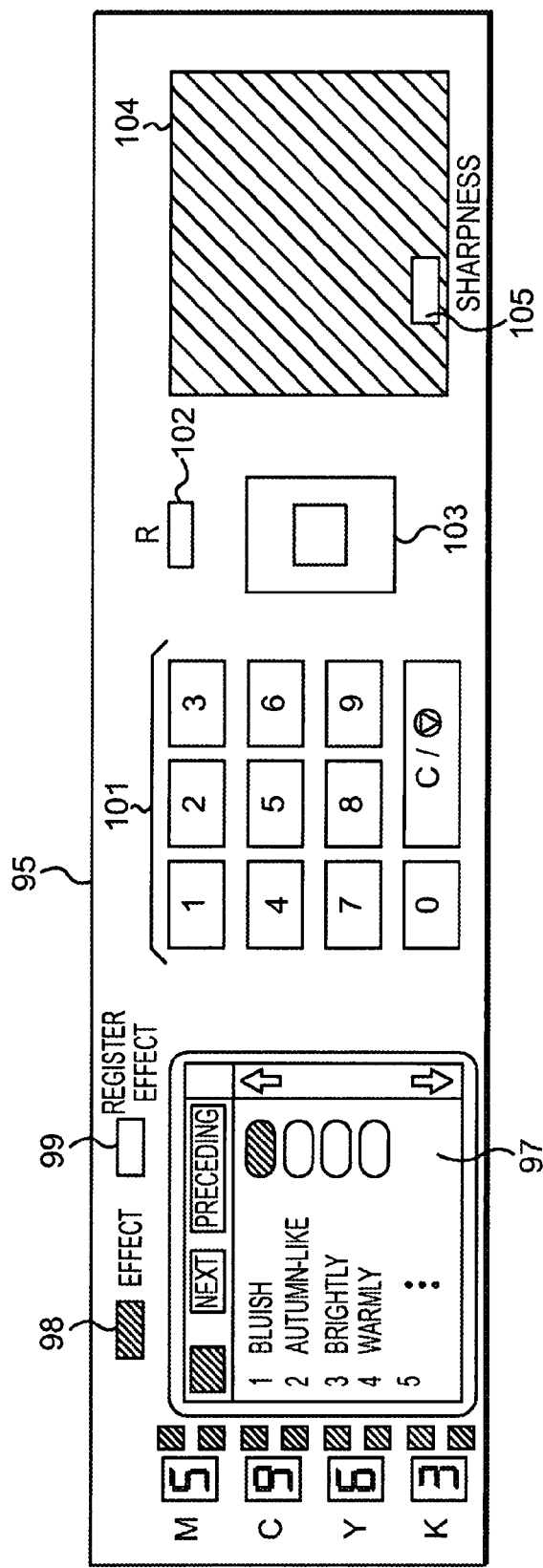
FIG. 11 is an external view of an operating section.
Figure 12A:
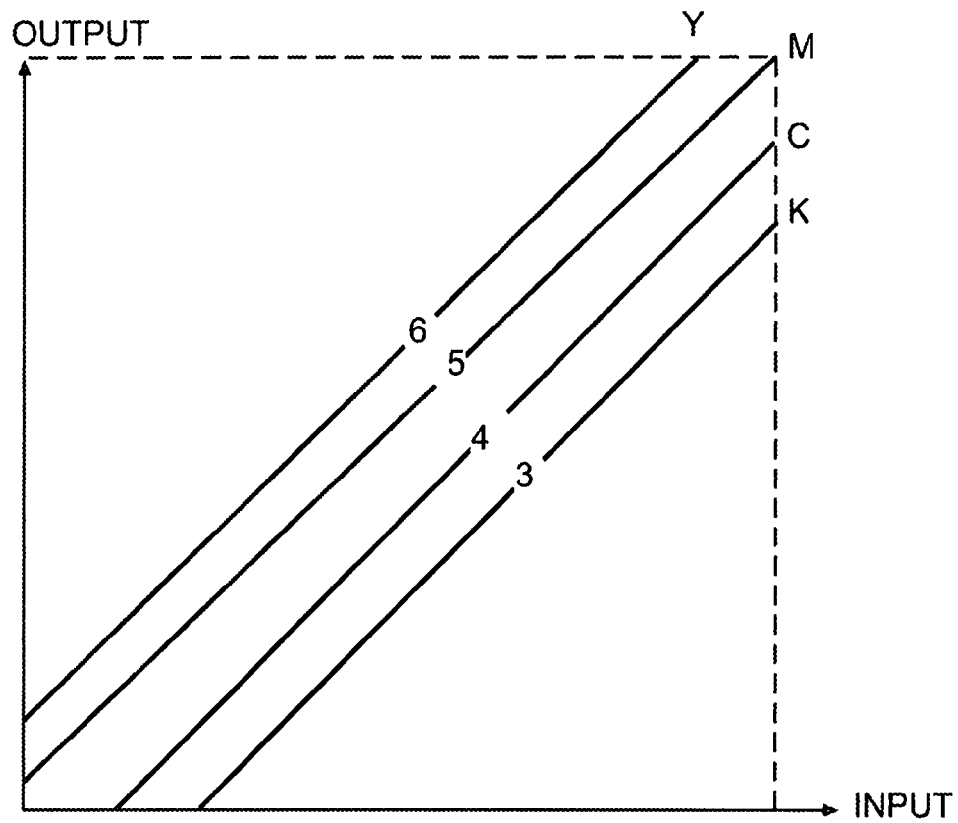
FIGS. 12A, 12B, 13 and 14 are diagrams for explaining the setting of density converting characteristics.
Figure 12B:
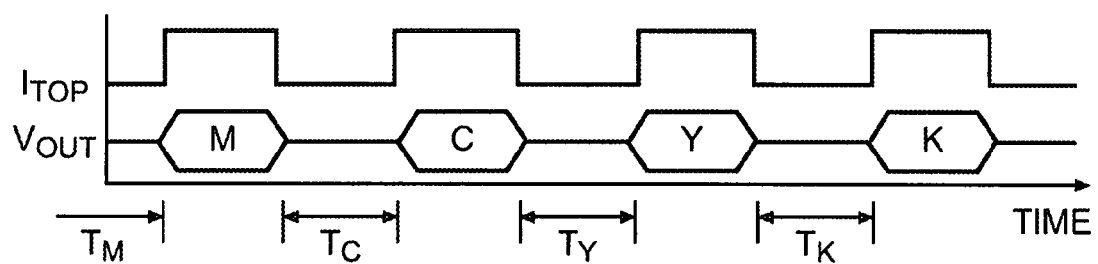
Figure 13:
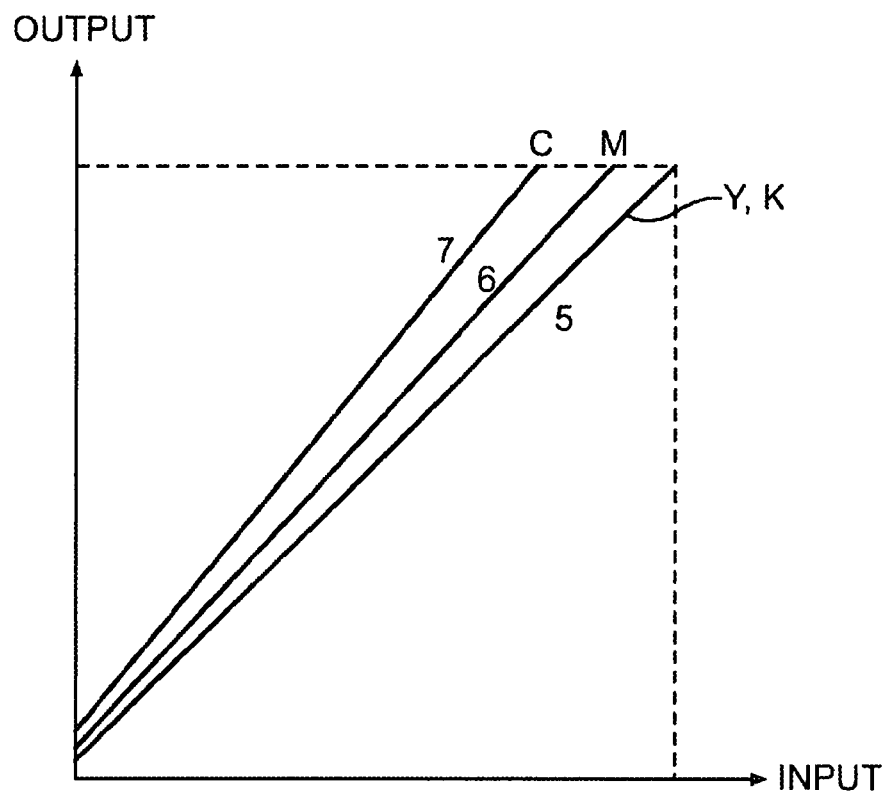
Figure 14:
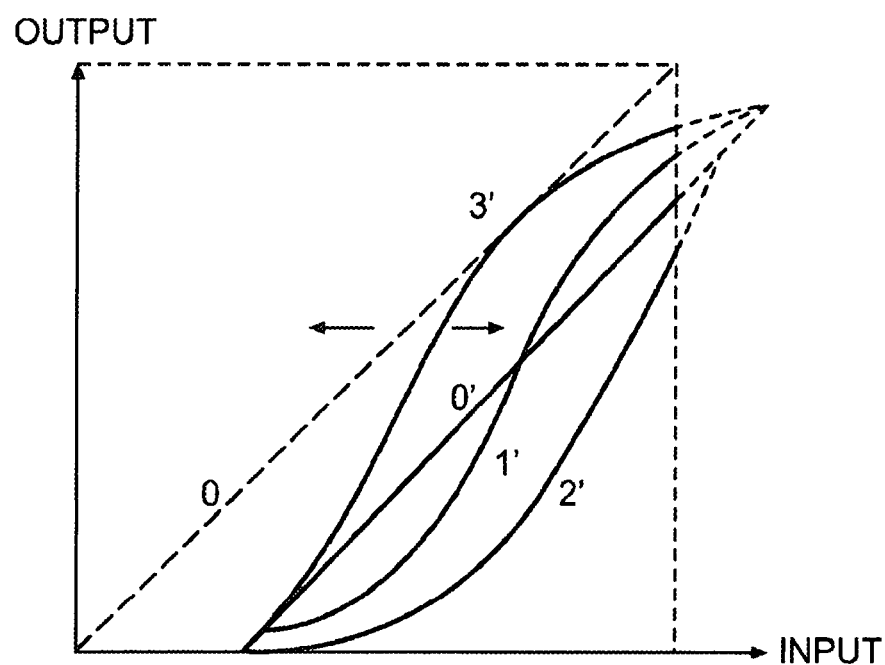

Explanation will now be made with respect to a method of designating and operating a state of a desired image for the area of an arbitrary shape which has been described so far, for instance, a color tone, a density, or an atmosphere of the image. FIG. 11 shows an example of an operating section embodying the invention. Reference numeral 96 denotes a key and display section to adjust the balance of the coloring agents, in which a numerical value indication "5" corresponds to a center value. Therefore, now assuming that M, C, Y and K are preset to 5, 4, 6 and 3, the straight line data having characteristics as shown in FIG. 12 is stored into the density conversion RAM 74 shown in FIG. 5(a). Since the present printer area sequentially forms the images in accordance with the order of M→C→Y→K, by rewriting the LUT 74 for periods of time $T_M$, $T_C$, $T_Y$ and $T_K$ other than the image generating time periods as shown in a timing chart of FIG. 13, the converting characteristics are changed every color, thereby adjusting the color balance. On the other hand, reference numeral 98 denotes an effect adjusting key and 99 indicates an effect registrating key. Those keys are used so as to obtain a similar effect by a method whereby the adjustment is performed in a one-touch manner by words for the color or atmosphere of the image, for example, the "words" to express a human feeling such as "Bluish", "Autumn-like", "brightly", or the like as displayed on a touch panel display screen 97 or a method whereby after the color balance, sharpness degree, color tone, and the like were adjusted, a resultant atmosphere is registered as feeling "words" and, thereafter, the registered character train is supplied. Ordinarily, the number of copies, the cassette selection, the number of sheets selected, the magnification setting, and the like are displayed on the display panel screen. However, they are omitted here because they are not concerned with the essence of the description of the present invention. For instance, as shown in FIG. 13, it is now assumed that a "bluish" image is obtained by setting the color balance of Y (yellow) and K (black) to 5 and by setting M and C to 6 and 7, respectively. In this instance, when the effect is registered by a method as will be explained hereinlater, by merely designating and inputting the registered characters "Bluish" after that, processing parameters are automatically set. For the areas of four arbitrary shapes, for example, when setting such that with respect to the magenta color, the area 1 is set to a hard tone and the area 2 is set to the highlight emphasis and the area 3 is set to the shadow emphasis as shown in FIG. 5(b), the color balance is set to 3 and adjusted to be slightly thin, so that each tone can be adjusted by using the setting (straight line Q') of 3 as a reference as shown in FIG. 14. Therefore, even in the case of the readjustment such as change and improvement of the adjustment so far, they can be adjusted by only the changing operation.

Figure 15A:
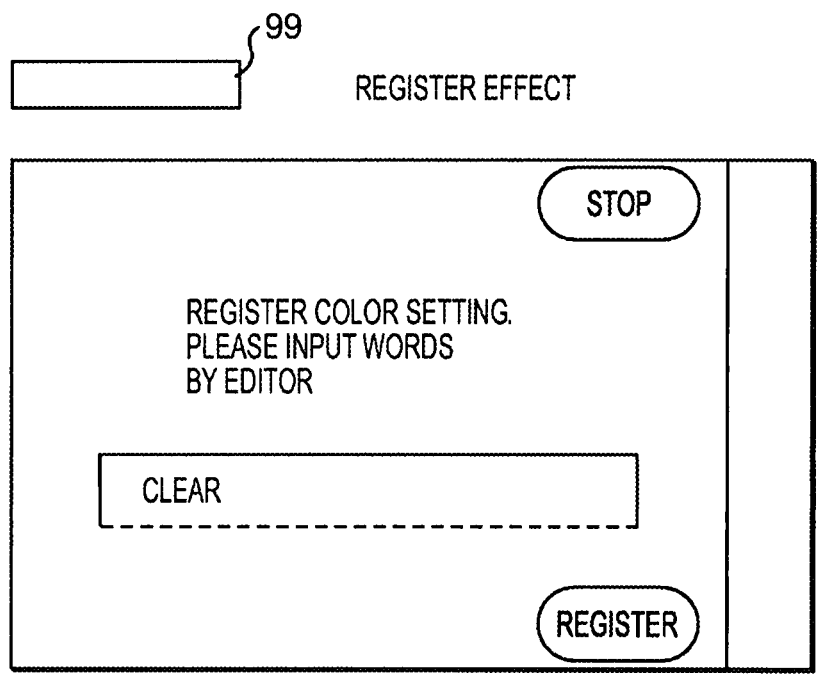
Figure 15B:
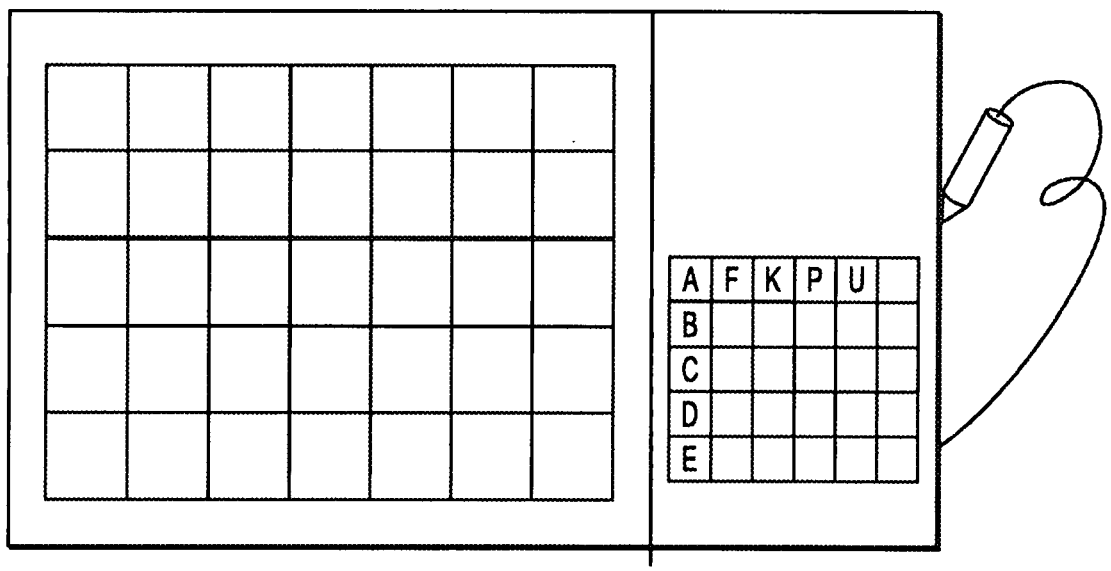

Methods of registering the effect and designating the effect will now be described in accordance with FIGS. 15 and 16. The effect registration is executed by the effect registering key 99. In the case of the adjustment performed by the user, for instance, in the case where the sharpness is slightly emphasized (the values of k and l shown in FIG. 4(b) are changed) and an undercolor removal amount and an inking amount are set to slightly large values (the characteristics of FIGS. 3(a) and 3(b) are set to IV) and a feeling of the image is set to be clear, by depressing the effect registering key 99 in the above state, the picture plane on the touch panel changes as shown in FIG. 15(a). Subsequently, by selecting desired characters from the character input area provided in a part of the editor as shown in FIG. 15(b), in this case, by inputting "c", "l", "e", "a", "r", "l", "y" and, thereafter, by touching the position of "Register", the parameters of the undercolor removal, inking amount, and edge amount are registered into the internal memory. FIG. 15(c) shows the contents in the memory. The adjustment parameters of "clearly" mentioned above are shown. The UCR characteristics with respect to M, C, Y, and K are set to "IV" and the inking amount characteristics are set to "IV". The color balance characteristics are set such that M, C, Y and K="5". The edge parameters are such that k=5 and l=14, which mean ¼. Therefore, as explained hereinlater, when the effect designation such as "clearly" is performed after that, the parameters in FIG. 15(c) are set into a predetermined register in the foregoing processing circuit corresponding to the designated area.

FIG. 16 shows displays on the operation panel showing an operating procedure to designate the effect.

Figure 16A:
Figure 18:
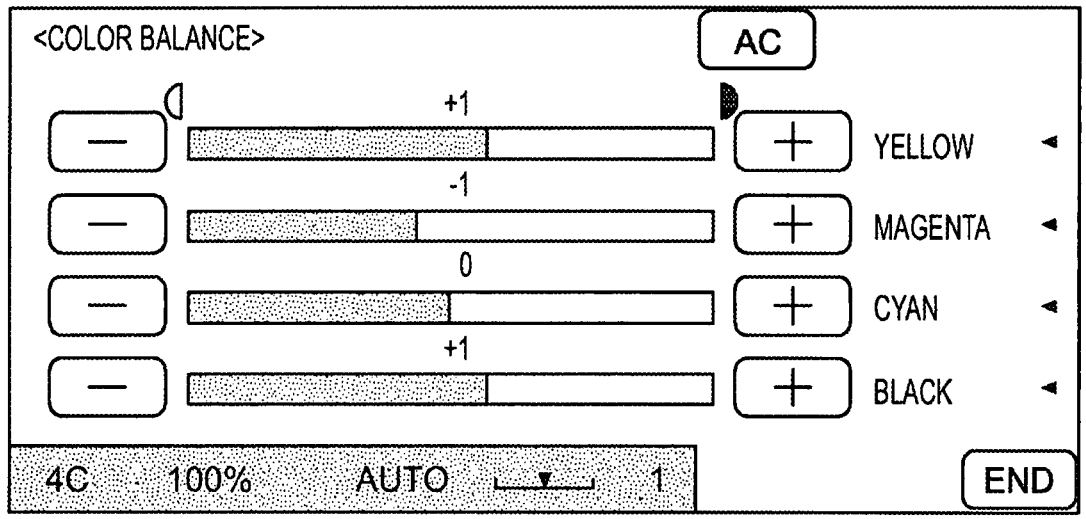
FIGS. 18, 19A, 19B, and 20 are diagrams for explaining a conventional technique.
Figure 19A:
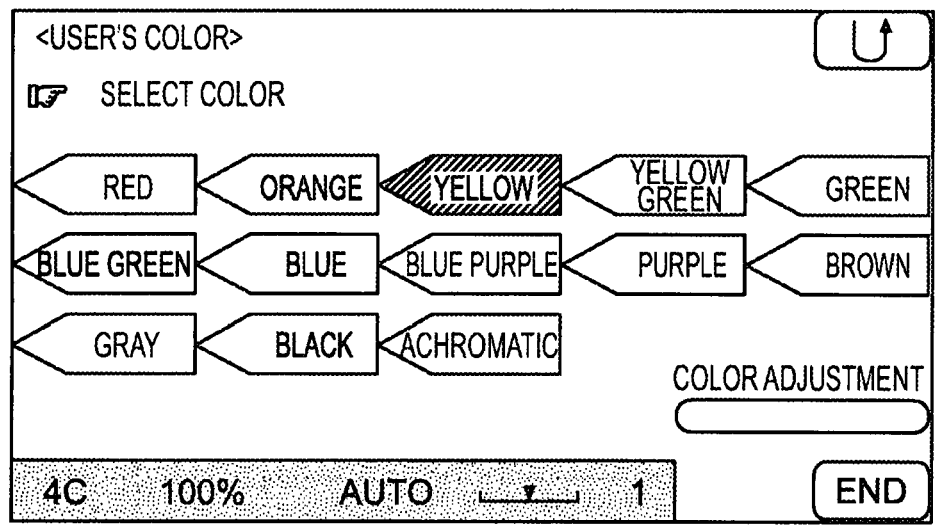
Figure 19B:
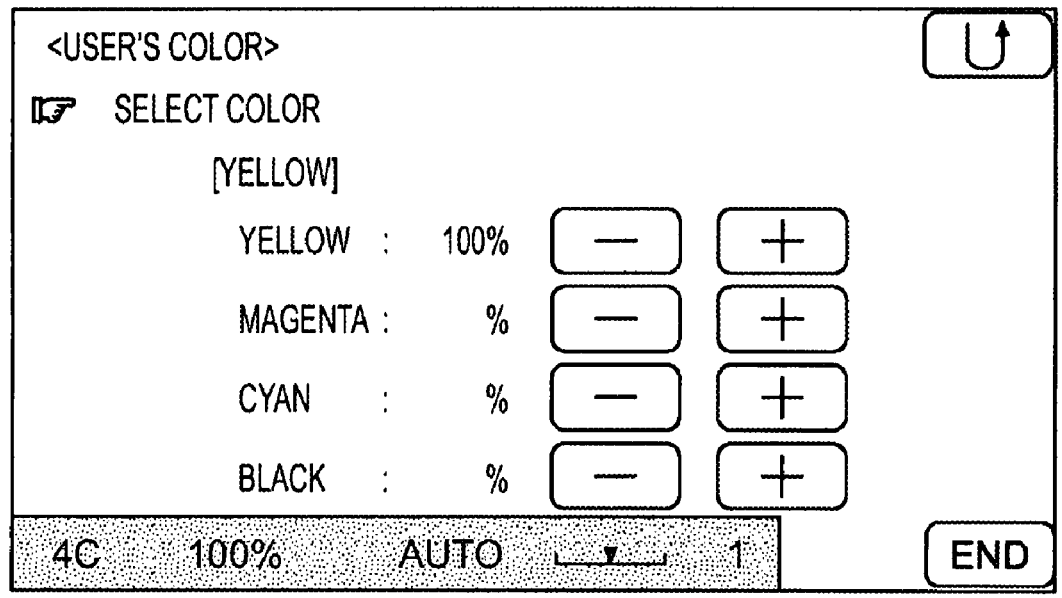
Figure 20:
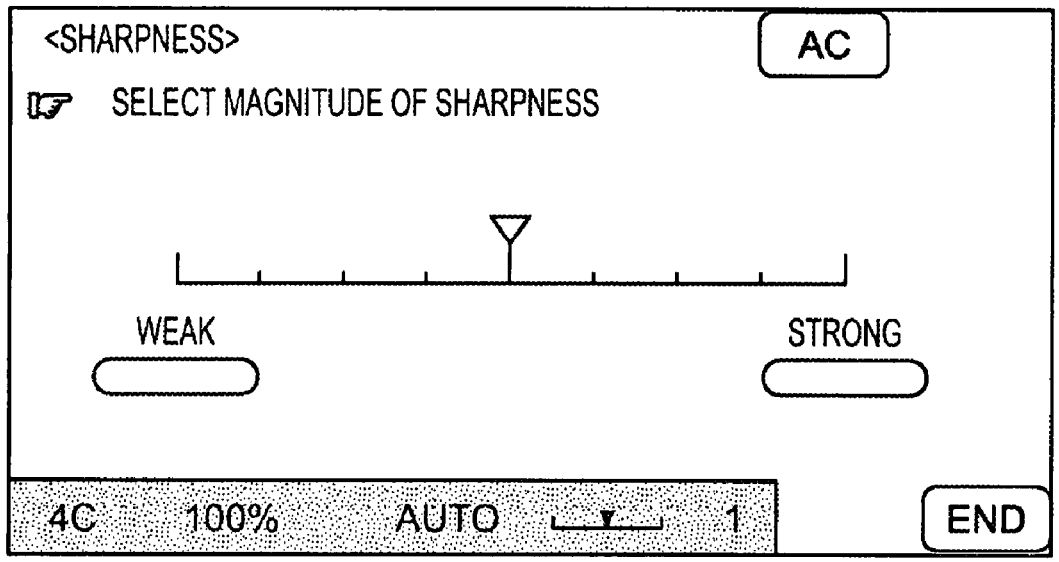

For the effect designation, by first depressing the effect key 98, the screen is changed to the picture plane of S1. Whether the area is designated or not is instructed. When there is an area designation, a rectangle or a non-rectangle is designated. In this case, for instance, since a non-rectangle is designated, the screen is changed to the picture plane of S2. In this state, a desired non-rectangular figure on the image is traced by an editor pen as shown in FIG. 16(b). As mentioned above, predetermined address arithmetic operations are executed into the relevant mask plane memory for area. After that, the data is written. After completion of the area designation, by touching the "OK" portion, the screen changes to the picture plane of S3. Since the user wants to designate "clearly" here, "c" is touched so as to search on the "c" row, so that "clearly" is displayed in the picture plane S4 selected by the "c" row. For "clearly", it is sufficient to use the foregoing effect registered condition setting. By designating "3. clearly" on the screen, the screen changes to the picture plane of S5. A degree of "clearly" is adjusted here. In the example, "clearly" denotes a degree of sharpness and can be switched to multi stages by rewriting the values of the foregoing coefficients k and l. For instance, as shown in FIG. 17, sixty-four kinds of parameter sets are stored in addresses $AD_0$ to $AD_{63}$ in the memory in a manner such that $k_n > k_{n+1}$ and $l_n > l_{n+1}$. Assuming that the coefficients k and l of the degree of sharpness set just before the adjustment in the picture plane S5 in FIG. 16(a) are set to $(k_n, l_n)$, k and l in the degrees 1, 2, ..., 9 of "clearly" shown in S5 are set so as to correspond such that $(k_{n-4}, l_{n-4})$, $(k_{n-3}, l_{n-3})$, ..., $(k_n, l_n)$, ..., $(k_{n+4}, l_{n+4})$. Therefore, for example, when "7" is selected in the adjustment of "clearly", $(k_{n+1}, l_{n+1})$ are set into the registers 71 and 69 in FIG. 4(b). Due to this, the state just before the adjustment and setting is used as a reference and the adjustment can be performed by a feeling of more "clearly".

FIG. 16(c) shows a modification of the above embodiment. In the embodiment, it is assumed that only "OK" is displayed in place of the picture plane S3.

In this instance, since the user wants to designate a feeling of "clear", "clear" is inputted by the editor pen and "OK" key is touched. When the touching operation of the "OK" key is detected by the CPU, "EFFECT" to select by using "clear" as a key word is searched. In this case, the words "clear" to "clearly" are searched and "clearly" is selected as an effect. Even in the case where a character train such as "clearing", "vividly", "vivid", etc. as synonyms of "clearly" are inputted, "clearly" is selected. Therefore, in the screen S4, the selected EFFECT "clearly" is displayed. When the operator again confirms by the "OK" key, the screen changes to the picture plane S5. A degree of "clearly" is adjusted here.

The memory means for search mentioned above is provided in the RAM 21 in FIG. 1 and the non-volatile performance is held by a battery or the like, so that the contents are not extinguished by the power-off.

Second Embodiment

Figure 24:
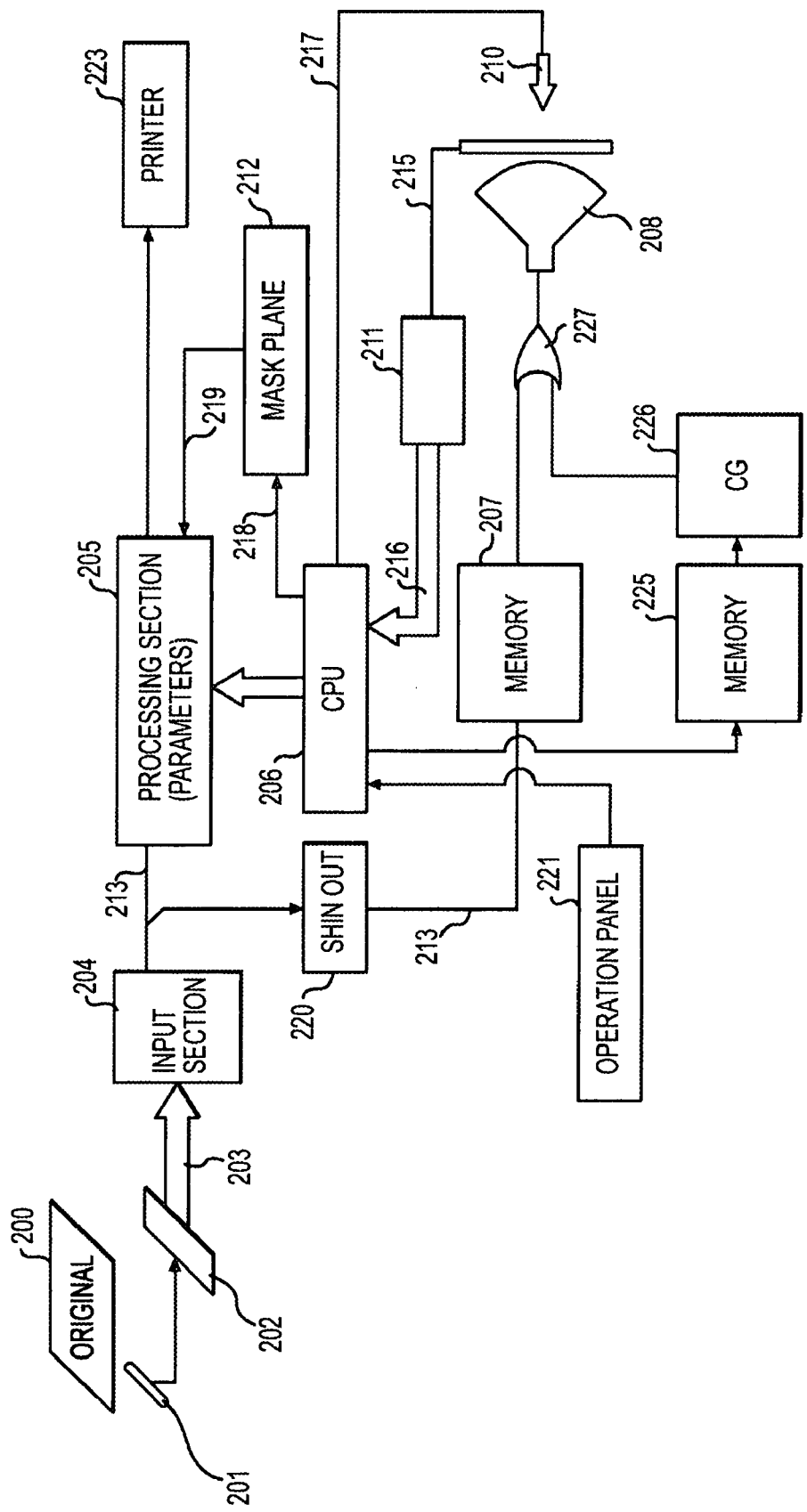
FIGS. 24 and 25 are diagrams showing constructions of other embodiments of the invention.

FIG. 24 shows the second embodiment. In the embodiment, the read image is thinned out by a thinning-out circuit 220 and a capacity is reduced and the resultant image is stored into a display memory 207. The read image is displayed on a display 208 in an operating section of the copying apparatus. The operator traces on a designating panel 209 by a pointing device 210. Area information 215 is supplied to a CPU 206 through an input port 211. On the other hand, the set information of the color and sharpness are given from an operating panel 221 and likewise supplied to the CPU 206. A picture quality of an arbitrary figure is adjusted on the basis of the data written in a mask memory plane 212 on the basis of the input area data and the parameters in a processing section 205 determined on the basis of the information of the set color and sharpness. Reference numeral 225 denotes a character code memory for character display. Reference numeral 226 indicates a character generator to display characters onto the display device 208. Characters to be displayed are sent to the display device 208 through an OR circuit 227, so that a picture plane is displayed as shown in FIG. 16(a). By designating on the picture plane by the pointing device, the operations for a procedure for designation and registration of characters are executed.

Third Embodiment

Figure 25:
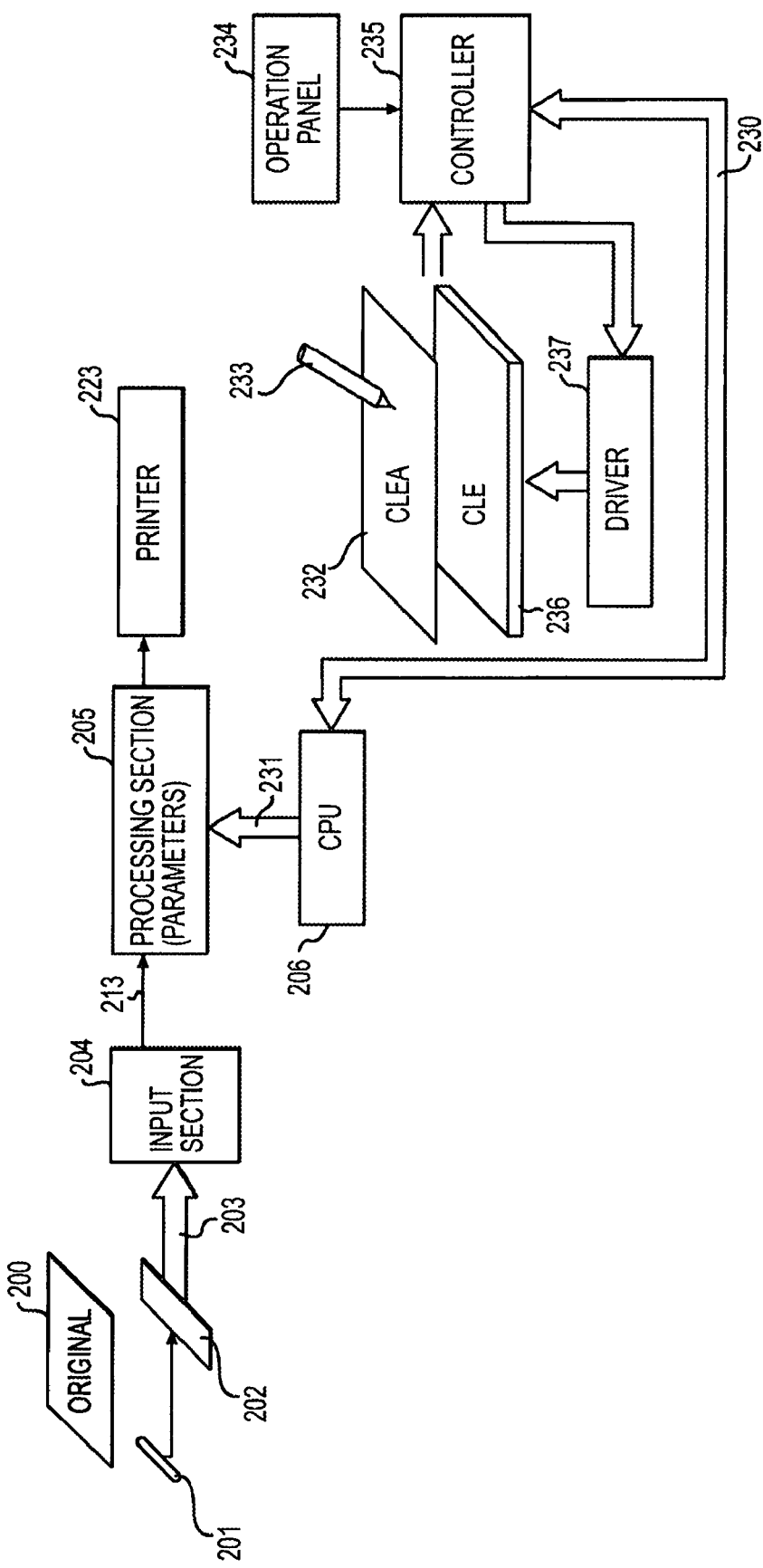

FIG. 25 shows the third embodiment. In the embodiment, a character train input apparatus by which a hand writing operation can be performed is used. Hand written characters given by a hand writing panel 232, a pen 233, and a display 236 are recognized by a controller 235 and sent to the CPU 206 via a bus 230. A code of the recognized characters is supplied to a driver 237. The recognized characters are displayed and checked. The adjustment regarding the picture quality, for instance, the color balance and sharpness can be instructed from an operation panel 234 in a manner similar to the first embodiment. On the basis of the input character train, the CPU 206 searches predetermined processing parameters and, after that, sets into a predetermined register in the processing section by a bus 231 and the present function can be realized.

As described above, according to the embodiment, the adjustment of the image can be registered and set by the character train such as words like, for instance, "Blue", "Autumn-like", "Cearly", "Brightly", etc. indicative of the feeling or atmosphere of the image, names like "TANAKA", "YAMAMOTO", etc., so that the complicated setting operations can be easily performed by a number of combinations. The above operations can be realized by the input means of character train, display means of character train, setting means and changing means of the image processing parameters, registering and reading means of character train indicative of the image format, and designating means of each of the processing contents.

As described above, according to the embodiments, the parameter sets for adjustment of the picture quality can be set up to the maximum memory capacity and can be also registered and set by the words near the human feeling. Consequently, even the operator who doesn't know the principle and apparatus for forming a color image can easily and simply adjust. Moreover, the functions can be also easily added and changed without adding any key. Therefore, the apparatus can be realized by cheap costs.

In the embodiments, the processing parameters are registered by the peculiar names by "words" using the digitizer. However, the invention is not limited to such a method. For instance, it is also possible to register by a combination with voice recognition.

In the embodiment, although the printer shown in FIG. 6 is used as a printer, another recording method such as an ink jet recording apparatus can be also used.

In such a case, the circuit shown in FIG. 2 for the color masking process and the circuit shown in FIG. 5(a) can be also provided in parallel every color component.

EFFECTS OF INVENTION

According to the invention, a number of complicated processing methods of a color image can be registered.

According to the invention, there is an effect such that the use efficiency is improved because the registered processing parameters can be searched together with the peculiar names.

The invention claimed is:

1. A color image processing apparatus comprising:
   a first input unit configured to input first information indicating plural variables, each of which corresponds to one of plural color corrections instructed by a user;
   a second input unit configured to input an identifier by a user;
   a registering unit configured to register the identifier input by said second input unit with a set of the plural variables input by said first input unit;
   a display unit configured to display the identifier registered in said registering unit so that a user can select the identifier;

a third input unit configured to input second information relating to a change of one of the plural variables corresponding to the selected identifier; and a color image processing unit configured to perform a color image process corresponding to the plural color corrections based on variables each of which corresponds to one of plural color corrections, wherein the variables includes a variable changed from one of the plural variables in accordance with the second information.

2. A color image processing apparatus according to claim 1, wherein said color image processing unit performs independently plural color corrections.

3. A color image processing apparatus according to claim 2, wherein each of the plural color corrections respectively corresponds to one of the variables.

4. A color image processing method comprising:

a first input step configured to input first information indicating plural variables, each of which corresponds to one of plural color corrections instructed selected by a user;

a second input step configured to input an identifier by a user;

a registering step configured to register the identifier input in a second input step with a set of the plural variables input in said first input step;

a display step configured to display the identifier registered in said registering step on a display so that a user can select the identifier;

a third input step configured to input second information relating to a change of one of the plural variables corresponding to the selected identifier; and a color image processing step configured to perform a color image process corresponding to the plural color corrections based on variables each of which corresponds to one of plural color corrections, wherein the variables includes a variable changed from one of the plural variables in accordance with the second information.

5. A color image processing method according to claim 4, wherein in said color image processing step performs plural color corrections independently.

6. A color image processing method according to claim 5, wherein each of the plural color corrections corresponds to a respective one of the variables.

* * * * *